United States Patent [19]

Pettit et al.

[11] Patent Number: 4,669,040

[45] Date of Patent: May 26, 1987

[54] SELF-TUNING CONTROLLER

[75] Inventors: John W. Pettit, Derwood, Md.; Douglas M. Carr, Sterling, Va.

[73] Assignee: Eurotherm Corporation, Reston, Va.

[21] Appl. No.: 652,181

[22] Filed: Sep. 19, 1984

[51] Int. Cl.$^4$ .............................................. G05B 13/00
[52] U.S. Cl. .................................. 364/162; 364/157; 318/610
[58] Field of Search ............................... 364/157–162; 318/609, 610, 561

[56] References Cited

U.S. PATENT DOCUMENTS

| | | | |
|---|---|---|---|
| 4,214,300 | 7/1980 | Barlow et al. | 364/162 |
| 4,539,633 | 9/1985 | Shigemasa | 364/157 |
| 4,549,123 | 10/1985 | Hagglund | 364/162 |

OTHER PUBLICATIONS

"Self–Tuning PID Controller Uses Pattern Recognition Approach" Kraus and Myron Foxboro Co.; Control Engineering, Jun. 1984, pp. 106–111.
Syscon International Inc.; "Rex–C1000 series Micro--processor–based Temperature Controllers"; Oct. 1, 1982, pp. 1–4.
"Unique Self–Tuning Option for Electromax ® V Proportioning Controllers"; Leeds & Northrup; 1981, pp. 1–4.
"AT–580 The Classic Automatic TM Self–Tuning Temperature Controller"; Barber Colman Company, Feb. 1982, pp. 1–14.
"How to Find Controller Settings from Process Characteristics"; Coon; Control Engineering; May 1956, pp. 66–76.
"Theoretical Consideration of Retarded Control"; Cohen and Coon; Jul. 1953, pp. 827–834.
"How to Set Three–Term Controllers"; Coon; Control Engineering; Jun. 1956, pp. 71–76.
"Optimum Settings for Automatic Controllers"; Ziegler and Nichols; Transactions of the A.S.M.E.; Nov. 1942, pp. 759–768.

Primary Examiner—Jerry Smith
Assistant Examiner—Allen MacDonald
Attorney, Agent, or Firm—Watson, Cole, Grindle & Watson

[57] ABSTRACT

Method and apparatus for self-tuning a Proportional Integral-Derivative controller for controlling at least one load characteristic to a predetermined setpoint from calculated values of Proportional Band (PB), Integral Time Constant (ITC) and Derivative Time Constant (DTC) by application of power to the load, establishing a cut-off point to remove power to the load, determining the slope of a measured value of the at least one load characteristic and starting an integral time counter upon detection of the power cut-off point, determining at least one value $X_{min}$ at which the value of the measured value decreases by a fixed percentage, determining the maximum value $X_{max}$ of the at least one load characteristic, calculating the values of the PB, ITC and DTC by determining the rise $X_r = X_{max} - X_{min}$ and determining PB and ITC from a stored table relating $X_r$ to PB and the value incremented in the integral counter, determining the DTC value from the value incremented in the integral counter, storing the values of PB, ITC and DTC in a non-volatile storage and controlling the load with the aforementioned calculated values of PB, ITC and DTC.

48 Claims, 18 Drawing Figures

A NOVEL SELF-TUNING ALGORITHM   5min/cm

PROCESS REACTION CURVE - SIMPLE

PROCESS REACTION CURVE - EXPANDED

A NOVEL SELF-TUNING ALGORITHM  5min/cm

INCREASED TO 2%  NO CHANGE  INCREASED TO 3%

INCREASED TO 4%  INCREASED TO 6%  INCREASED TO 8%

INCREASED TO 12%  NO CHANGE  NO CHANGE

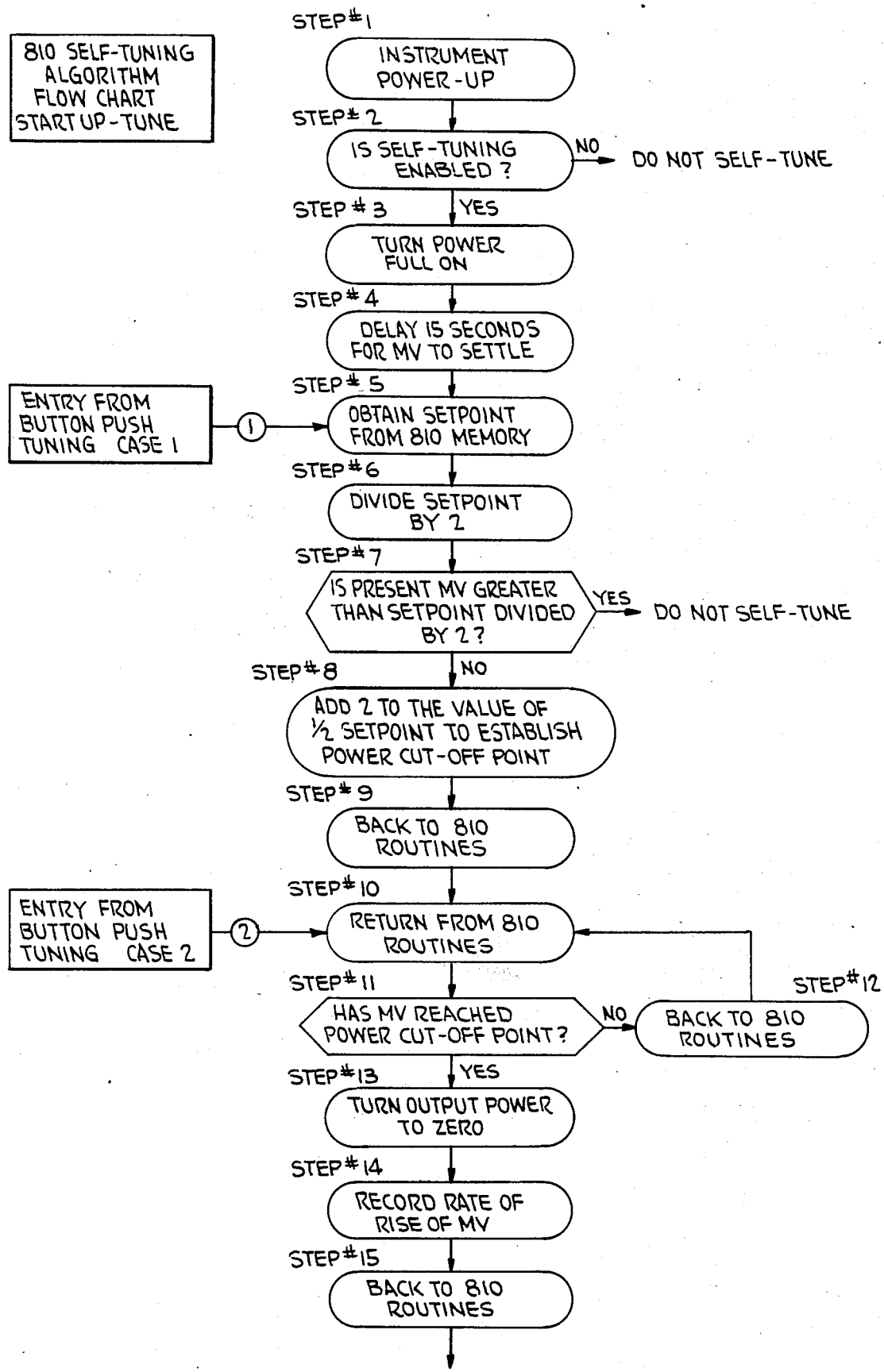

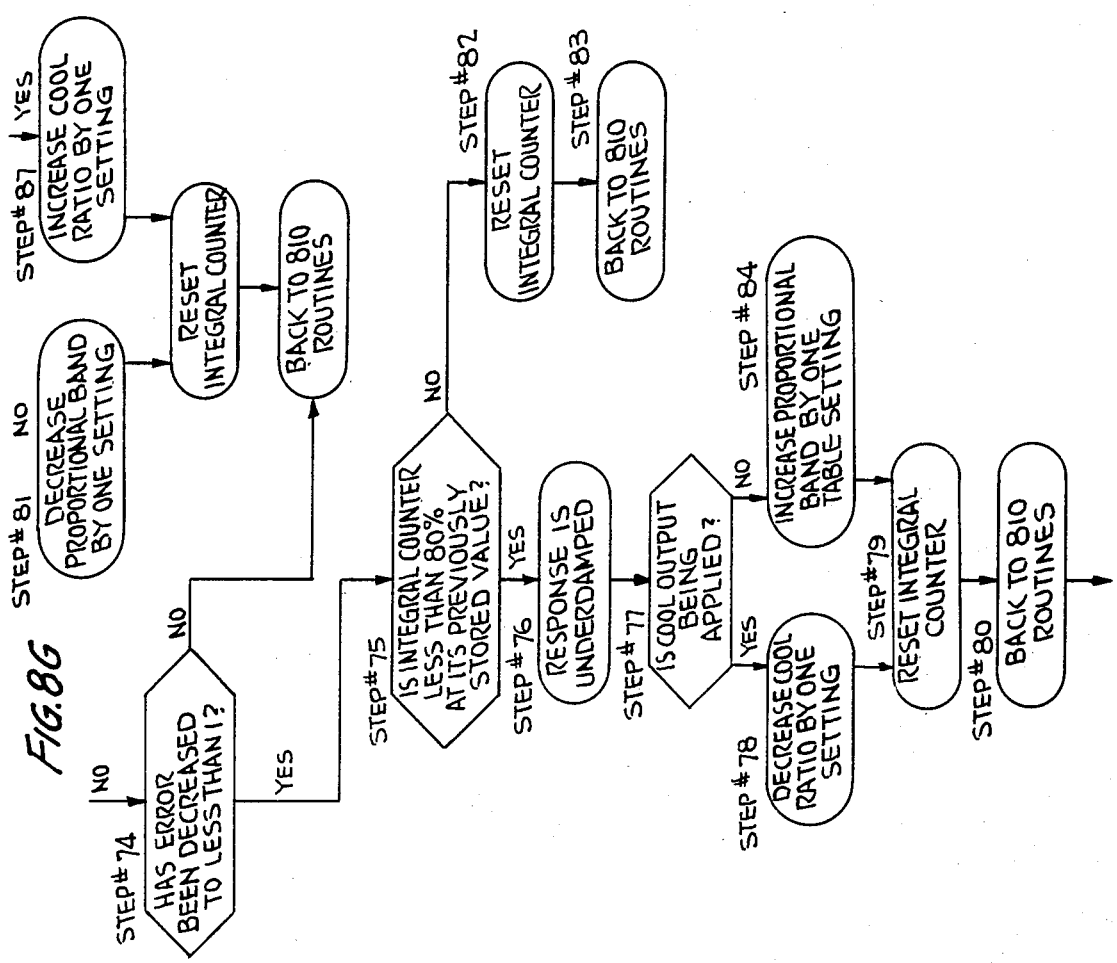
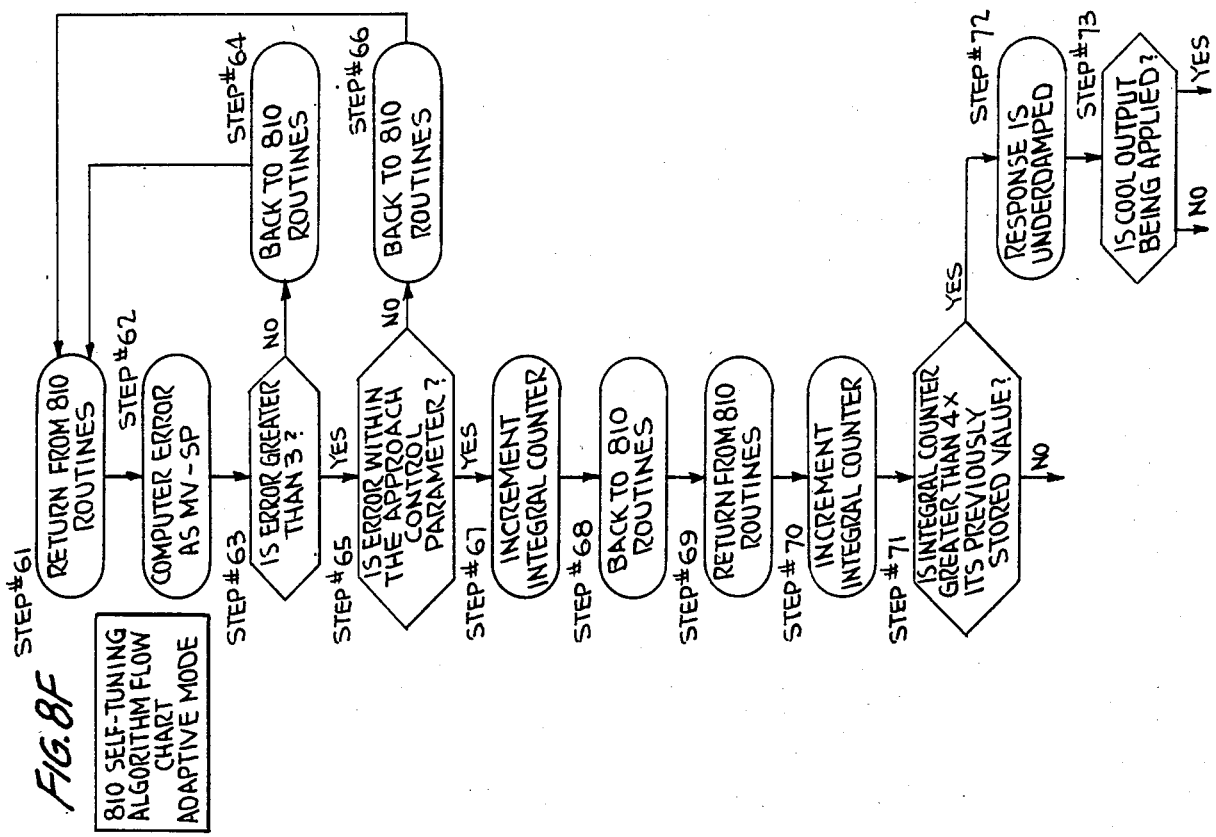

SELF-TUNING CONTROLLER

FIELD OF THE INVENTION

This invention relates to method and apparatus for tuning electrical controllers, and more particularly to such electrical controller apparatus that are adapted for self-tuning to determine one or more modes of control parameters such as Proportional, Integral and Derivative, or any combination thereof to control a variable such as temperature.

BACKGROUND

Self-tuning or adaptive controllers are known in the control art and have been implemented in many specialized applications. The introduction of microprocessor technology has enabled self-tuning or adaptive process controllers to become a significant commercial reality.

Proper tuning of a controller is not only essential to the correct operation thereof, but also affords a commensurate improvement in product quality, scrap reduction, decreased down-time and economical operation of the process and/or apparatus controlled by the controller. Procedures for tuning conventional Proportional, Integral and Derivitive (hereinafter PID) controllers are well established and relatively simple to perform, but are often time-consuming. The replacement of a controller, or a significant component thereof, as well as a portion of the apparatus being controlled, requires re-tuning of the controller. Such re-tuning often is very difficult and requires considerable knowledge and skill of the process operator. Some controllers have digital settings for the three control parameters, Proportional Band (PB), Integral Time Constant (ITC) and Derivative Time Constant (DTC), which simplifies the reproduction of the correct control parameter settings when a controller is replaced, for example. However, such digital settings are not of any assistance if, for example, a controlled heater element is changed, or the mechanics of the controlled system are appreciably altered. The associated controller in such instances requires re-tuning.

Most conventional temperature controllers, whether analog or microprocessor-based, are three-term, PID controllers. In such PID controllers the control algorithm is based on a proportional gain, an integration action and a derivative action. On more refined and complex controllers, relative cool gain adjustment and a parameter for overshoot inhibition are provided.

As used herein, Gain, or more commonly Proportional Band, PB, simply amplifies the error between a desired setpoint and a measured value to establish a proper power level. The term PB expresses the controller gain as a percent of the span of the controller. For example, a 25% PB equates to a gain of 4; a 10% PB is a gain of 10, etc. Thus a controller with a span of one thousand degrees and a PB of 10% defines a control range of one hundred degrees around setpoint. Also, if the measured value is twenty-five degrees below setpoint, the output level will be twenty-five percent. The PB determines the magnitude of the response to an error. If the PB is too small (high gain) the controlled system could oscillate because it is over-reponsive to the controller. However, a wide PB (low gain) may result in control "wander" due to a lack of responsiveness of the controlled system. The "ideal" control situation is achieved when the PB is as narrow as possible without causing oscillation.

Integral Action, or Automatic Reset, is probably the most important factor governing control at setpoint. The Integral term (I) slowly shifts the output level as a result of an error between setpoint and the measured value. If the measured value is below the setpoint the Integral Action will gradually increase the output power level in an attempt to correct this error. The adjustment of Integral Action is normally in the form of a time constant or the Integral Time Constant, ITC.

The longer the ITC, the more slowly the power level of the controlled heater is shifted. Alternatively, if the Integral term is set to a fast value, the heater power level could be shifted too quickly, thereby inducing oscillation as the controller is attempting to control faster than the load can change. Conversely, an ITC that is too long results in very sluggish control. Lengthening the ITC results in markedly slower response, but the overshoot is substantially eliminated as the control settles to the setpoint.

Derivative Action, or Rate, provides a sudden shift in output power level as a result of a sudden or quick change in the Measured Value, MV. Should the MV drop quickly, the derivative term provides a large change in the output level in an attempt to correct the perturbation before it goes too far. Derivative Action is the most beneficial control action in causing a controlled system to recover from small perturbations.

Derivative Action is usually associated with overshoot inhibition rather than with transient response. In fact, Derivative Action should not be used to curb overshoot on start-up because the steady-state performance of the controller is seriously degraded. A separate parameter such as Approach Control is normally used to prevent overshoot and is independent of the PID tuning values and does not affect their performance. By using such a variable overshoot inhibition parameter, a system can be set up for optimum steady-state response and the overshoot can be eliminated as desired.

Each implementation of a PID algorithm behaves in a slightly different manner because of the subtle variations in the controller's algorithm. For example, some controllers may provide excellent overshoot inhibition as an inherent characteristic, or perhaps superior response to setpoint changes. These are some of the factors that may make one controller more suitable than another for a particular system to be controlled.

The introduction of microprocessors to control technology has greatly increased the flexibility of controllers as is known to the controller art. For example many control parameters, such as for example, overshoot inhibition, might have been built into an anaog type controller in an unalterable way. With the use of a microprocessor such a control parameter is now adjustable.

There are several established and well known techniques for evaluating and determining the control characteristics and parameters of controlled loops and systems and which are adaptable to the design of self-tuning controllers. For example, to name a few, there are the Model Reference Approach, the ON/OFF Control Approach, the Process Reaction Curve Technique, the Ziegler-Nichols Step Response Method, and the Ziegler-Nichols Closed-Loop Cycling Method. Of these classical control theory approaches, the two most common are the Process Reaction Curve Technique (PRCT) and the Closed-Loop Cycling Method (CLCM). While other approaches are known, and could conceivably be adapted to the design of self-tuning controllers, the preferred control technique used in designing and developing the self-tuning controller of this invention is the CLCM for reasons discussed more fully herein. However, it is to be understood that the self-tuning controller of this invention can be adapted to any control theory approach using the techniques disclosed and described herein.

Control techniques other than those specifically enumerated above do exist. For example, modern control theory, with the State-Variable Concept, could be used, but is considered to be too complex for adaptation to the type 810 Microprocessor-Based 3-Term Controller that has been adapted using the self-tuning concepts disclosed and described herein and forming the basic concepts of this invention. Moreover, the State-Variable Concept may not be commercially viable, as the marketplace, at the time of this invention, has accepted the PID approach to controller design. A well-tuned PID controller affords near optimum performance which could not be significantly improved by, for example, the State-Variable approach.

Another control technique is Gain-Scheduling but that technique merely uses parameters, such as Gain or PB, which are adjusted according to prearranged criteria. That does not enable adjustment of the self-tuned controller for unknown loads, for example, and therefore is not a self-tuning algorithm in the context of that disclosed and claimed herein.

Auto-Correlation and Cross-Correlation techniques can also be used to advantage to extract process characteristics blurred by noise, but such correlation techniques are slow to respond since they require many sampling periods to deduce operating parameters for control purposes. However, such techniques could be employed in designing a self-tuning controller in accordance with the concepts and principles of the present invention in those applications where such slow response was acceptable. Such adaptation would require significantly more memory capacity than is available in the 810 type controller described herein and which has been modified to incorporate the self-tuning techniques described and disclose herein.

Other control techniques include those used by 'educated and sophisticated" system operators in which the control loops of a controlled system are tuned manually. Such manual tuning techniques involve observing the response of the system under certain conditions and calculating the control parameters from a set of formulas, which are typically fairly simple. Such manual techniques, which are software-adaptable or implementable, could be termed "automated tuning", wherein the computer or microprocessor automates the operator manipulations. Such methods result in tuning constants that are reasonably optimal in any given situation, but not necessarily perfect, as they are based on certain assumptions and approximations. But they achieve satisfactory pragmatic results.

The PRCT and CLCM control theory design techniques introduced by Ziegler and Nichols in an article entitled "Optimum Settings for Automatic Controllers"; Transactions of A.S.M.E.; November, 1942; pp 759–767, defined "optimal tuning" as being achieved when the controlled system responds to a perturbation with a 4:1 decay ratio. For example, given an initial perturbation of $+40°$, the controller's subsequent response would yield an undershoot of $-10°$, followed by an overshoot of $+2.5°$. Such a definition of "optimal tuning" may not suit every application and therefore the "tradeoffs" must be understood.

The 4:1 decay ratio criteria of Ziegler-Nichols is adopted herein solely for the purpose of describing the self-tuning principles of the invention. Other criteria are applicable to the self-tuning techniques described herein, and the scope of the invention is not intended to be limited by such criteria.

The principles of PRCT are shown in FIG. 1 and require that the controller is removed from the control loop or system and a step perturbation injected into the loop or system. The perturbation has a level that is convenient and non-damaging to the system, but should be introduced when the system is stable at ambient temperature. The time L is often referred to as the Lag Time and is considered to be the time necessry to overcome the thermal inertia of the load being heated. A straight line drawn tangent to the process reaction curve at the point of inflection has a slope R as shown in FIG. 1. From the slope R and Lag Time L, the PID values may be calculated by the following equation.

$$PB = RL/P \times 100\%/(\text{span})$$

where $TI = 2L$ and $TD = 0.5L$. It is noted that PB is expressed as percent of instrument span, whereas TI and TD are time constants expresed in minutes. P is the percent power level used as the step input divided by 100 (expressed as a fraction).

G. H. Cohen and G. A. Coon modified the PRCT technigue to yield a more thorough evaluation. Their contributions to such techniques are exemplified in the following publications: (1) "Theoretical Consideration of Retarded Control; Transactions of A.S.M.E.; July 1953; pp 827–833; (2) "How to Find Controller Settings from Process Characteristics"; G. A. Coon; Control Engineering; May 1956; pp 66–76; and (3) "How to Set Three-Term Controllers"; G. A. Coon; Control Engineering; June 1956; pp 71–75.

Exemplary results are illustrated in FIG. 2, where T is the final attained temperature expressed as a percent of span of the controller as a result of the step input P; and P is the step input of power expressed as a percent of maximum allowable power; and $K = T/P$. The results of the evaluation are shown in FIG. 2 and Table I below.

TABLE I

| CONTROLLER | PROPORTIONAL BAND | INTEGRAL TIME CONSTANT | DERIVATIVE TIME CONSTANT |
|---|---|---|---|
| Proportional only | $\dfrac{KT1}{T2(1 + T1/3T2)}$ | | |
| Proportional plus Integral | $\dfrac{KT1}{T2(0.9 + T1/2T2)}$ | $\dfrac{T1(30 + 3T1/T2)}{9 + 20T1/T2}$ | |
| Proportional plus Derivative | $\dfrac{KT1}{T2(1.25 + T1/6T2)}$ | | $\dfrac{T1(6 - 2T1/T2)}{22 + 3T1/T2}$ |

TABLE I-continued

| CONTROLLER | PROPORTIONAL BAND | INTEGRAL TIME CONSTANT | DERIVATIVE TIME CONSTANT |
|---|---|---|---|
| Proportional, Integral and Derivative | $\dfrac{KT1}{T2(1.3+T1/6T2)}$ | $\dfrac{T1(32+6T1/T2)}{(13+8T1/T2)}$ | $\dfrac{4T1}{(11+2T1/T2)}$ |

It is again noted that the goal in the above Ziegler-Nichols techniques and the Cohen-Coon techniques is to obtain a 4:1 decay ratio, which may not be suitable for all applications. For example, to reduce overshoot and lengthen the settling time, the PB and ITC should be increased.

In the CLCM, a Proportional-Only controller (no Integral or Derivative terms) is placed in oscillation by setting the PB to a very small value such that the control loop will cycle with a characteristic frequency. The characteristic system oscillation frequency is a very accurate representation of the system's responsiveness and therefore can be used to derive the controller time constants as is well known to those skilled in the system control art.

An outline of the procedure for the CLCM follows:
1. Eliminate Integral and Derivative action from the controller.
2. Reduce the PB until the control loop oscillates and measure the period of oscillation, T.
3. Widen PB until the process is just slightly unstable. This value of PB, P, is referred to as the point of "ultimate sensitivity".
4. Table II below provides the values of Pb, TI and TD.

TABLE II

| CONTROLLER | PRO-PORTIONAL BAND | INTEGRAL TIME CONSTANT | DERIVATIVE TIME CONSTANT |
|---|---|---|---|
| Proportional only | 2P | | |
| Proportional plus Integral | 2.2P | .8T | |
| Proportional plus Integral and Derivative | 1.67p | .5T | .12T |

The settings in Table II establish control with a 4:1 decay ratio which may provide too much overshoot for some processes or applications. Table III provides guidelines for altering the values in Table II when using Proportional, Integral and Derivative terms.

TABLE III

| CONTROL ACTION | PRO-PORTIONAL BAND | INTEGRAL TIME CONSTANT | DERIVATIVE TIME CONSTANT |
|---|---|---|---|
| Underdamped | P | .5T | .125T |
| Critically Damped | 1.5P | T | .167T |
| Overdamped | 2P | 1.5T | .167T |

These values have been used in the response curve shown in FIG. 3.

The CLCM, or Ziegler-Nichols Closed-Loop Cycling Method, involves placing the loop or system in oscillation, which could be damaging because of the repeated overshoot and undershoot, which may in some instances be excessive. The Cohen and Coon PRCT evaluates the process near ambient and therefore could provide a misrepresentation of the process response at setpoint. Many processes change their characteristics with the application of heat. For example, in furnace applications there is a shift from convection heating to radiant heating at higher temperatures. Plastics machinery behaves in an entirely different manner when cold than when it is at operating temperature and is full of plasticized material under extreme pressure. For the aforementioned, as well as other, reasons it is at least desirable, if not essential, to tune a control loop when it is at operating temperature.

Perhaps the most commonly used technique for tuning a loop is to manually set parameter values based on operator experience, and then observe the results. While that method may be excellent for "fine-tuning" a controller, it usually requires an extensive amount of experience to be commercially useful.

As has been stated repeatedly above, the Ziegler-Nichols and Cohen-Coon tehniques are based on a 4:1 decay ratio, which is generally considered to be somewhat too oscillatory for the temperature control of plastics machinery. Frequently in plastics machinery applications, the engineer setting up the process determines how the temperature controller should respond to various perturbations. Thus, it is evident that the control algorithm of a self-tuning controller is extremely critical in achieving desirable, much less optimal, control of a process or system.

Another aspect of self-tuned controllers is that the control algorithm is often tailored for a certain industry's application and requirements, and therefore is limited in its range of control applications as it can only optimally control a specific type load. Moreover, since most self-tuned controllers generate a Derivative setting, they cannot be used for tuning transport lags, such as diameter control loops or air flow systems. There is also a limit to the adjustment range of the PID parameters so that the controller may not be applicable to loads which are very fast or have a high gain.

A self-tuning controller affords considerable advantages in the time involved in tuning a particular control loop because it can repeat a tuning procedure reliably when significant process changes are made or the controller is replaced, without requiring the control operator to carefully monitor the performance. That is the primary advantage of self-tuned controller.

Self-tuning control algorithms are programmed into microprocessors which are capable of generating the control signals to follow the algorithm step-by-step, make decisions based on data obtained from peripheral measuring or sensing devices, and to perform calculations required by the self-tuning algorithm. Certain of the control techniques described above utilize step-by-step procedures and require simple measurements and calculations. If the PRCT of Ziegler and Nichols is adapted for the self-tuning procedure, the assumption is made that the Lag Time calculated at ambient temperature relates to the system time constants at operating temperature. The controlled zone or area can be place under ON/OFF control for several periods of oscillation to establish the tuning parameters, providing that the system or process under control can tolerate such oscillations. A self-tuning controller may also attempt to model the load being controlled to determine the control parameters and constants for the tuning procedure. Such self-tuning controllers are apt to be quite expensive because of the memory and storage capacity required for the model program. Additionally, such control systems generally require that the operator respond to a number of questions prior to, or during, tuning.

SUMMARY OF THE INVENTION

A primary object of the invention is to provide self-tuning controllers having some or all of the following capabilities:
1. Determine optimal values of PB, Integral Time Constant (ITC) and Derivative Time Constant (DTC).
2. Require no operator attention.
3. Attain the required operating tmperatures as quickly as possible without any overshoot.
4. Allow a forced re-tune if required or desired.
5. Retain the tuning parameters in non-volatile memory so that tuning need not be performed after a short duration power failure.
6. Allow manual over-ride of the self-tuning function.

The above-enumerated characteristics 1-3 are concerned with the day-to-day operation of the self-tuning controller. With reference to FIG. 3, which shows the principles of the self-tuning method of the invention, power is applied to the self-tuning controller at time $t_0$, a point well below the temperature setpoint $V_4$, and a heat demand output is delivered to the load. As the temperature of the load increases, the temperature rise is monitored by the controller using suitable well known temperature measuring or sensing devices, such as thermocouples. The 810 controller adapted by the invention as a self-tuning controller includes an Over-Heat Output limit to prevent heater burn-out with over-powered loads. In accordance with one aspect of the inventive self-tuning algorithm, when the load temperature reaches a temperature $v_1$, approximately one-half to the setpoint temperature $v_4$, the heater power is switched off or to 0%. At that time $t_1$ an ITC counter is started. Because of normal thermal inertia of the load, the temperature thereof continues to coast for a period of time (from time $t_1$ to time $t_3$) before it begins to drop off at temperature $v_3$. The time $t_2$ at which the slope of the temperature curve changes is marked and stored to be used for the PB calculations. Once the load temperature has stopped rising and begins to fall at time $t_3$, the PID tuning parameters may be calculated and inserted into the 810 control algorithm.

For the purposes of this invention the CLCM for determining system tuning parameters is preferred. The method described and disclosed herein for the 810 Self-tuning Controller actually establishes one quarter-cycle of closed-loop oscillation to determine the parameter values. Additionally, because the ITC counter is started when the power to the load is first switched off, the ITC also reflects the normal thermal inertia of the system.

Once the PID tuning parameters have been calculated and inserted into the control algorith, the controller establishes normal operation. FIG. 4 illustrates the start-up tuning evaluation followed by the initiation of setpoint attributed to the variable overshoot inhibition parameter, the response to a +20° and −20° perturbation, and finally the effect of a +25° and −25° setpoint change. The start-up, quarter-cycle tune evaluation actually only adds one ITC to the total setting time. The significant advantages of the aforedescribed tuning method are:
1. The system tunes above ambient within the linear portion of the operating range; and
2. Tuning occurs below setpoint to avoid overshoot.

With respect to ideal feature number 4, by correct depression of the 810 controller front panel pushbuttons, the control loop can be placed in ON/OFF control for one cycle. FIG. 5 is an example of such tuning operation together with the response to +20° and −20° perturbations, as well as 25° setpoint changes. However, such tuning initiation should only be required if a system component is replaced while the system control is in full operation.

A significant feature of the self-tuning method of the invention is the capability of modifying the PB by establishing a "response window" within which the response of the system is monitored. If the system response is not within desired limits, the PB is recalculated to optimize the system response characteristics.

The remaining refinements of the 810 self-tuning method address features 5 and 6 defined previously. Non-volatile EAROM memory is a standard feature of the 810 microprocessor-based 3-term controller and is used for long term storage of setpoint, tuning parameters and alarm points. Non-volatile storage is a critical feature if the controlled system is in an environment where brown-outs or black-outs are common.

Another feature of the 810 self-tuning controller is its capability to disable the self-tuning process. Once the 810 controller is up to temperature and has established its tuning parameters, the self-tuning process can be turned off and the control parameters "fine-tuned" for optimal temperature control.

The 810 self-tuning controller as described herein also has the capability of tuning by a plant-monitored process whereby the responses to perturbations are monitored and the tuning parameters modified if necessary. If the measured value MV deviates from setpoint for some reason, the 810 controller monitors the response. The MV must return to setpoint within a specified time window to be considered satisfactory. If that does not occur, the PB is modified to hasten or dampen the response, whichever is appropriate under the circusmstances.

FIG. 4 highlights the PB movement, wherein initially the PB is set to an unreasonably small value resulting in an oscillatory response to a perturbation. A first perturbation causing the oscillatory response causes the controller to increase the PB. Subsequent perturbations continue to cause the controller to re-evaluate the PB until the controller is satisfied with the results in accordance with the algorithm programmed therein.

The self-tuning controller of the invention achieves discernably better results as compared to a controller with fixed time constants under all conditions that are normally encountered. An untrained operator of the self-tuning controller can operate it with minimum effort or involvement in the control process.

BRIEF DESCRIPTION OF THE DRAWINGS

The above features, advantages and objects of the invention will be apparent from the following description of a preferred embodiment of the best mode of carrying out the invention when taken in conjunction with the drawings, wherein:

FIGS. 8A–8H are flow diagrams illustrating the inventive self-tuning method.

DETAILED DESCRIPTION

Figure 1:
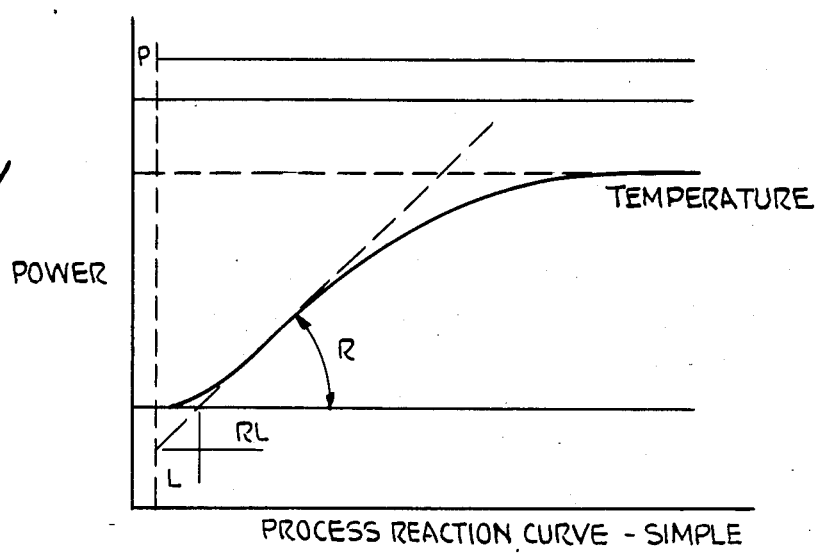
FIG. 1 demonstates the PRCM of developing the time constants of a temperature control system.
Figure 2:
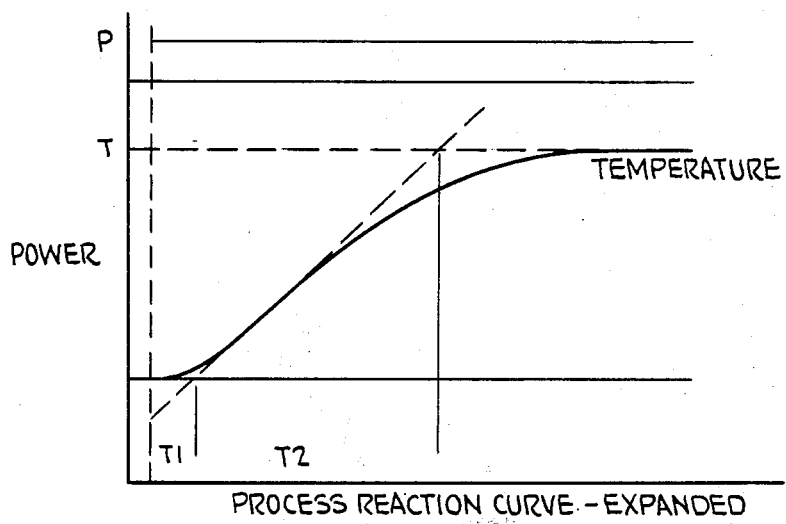
FIG. 2 illustrates the principle of the PRCM developed by Cohen and Coon.
Figure 3:
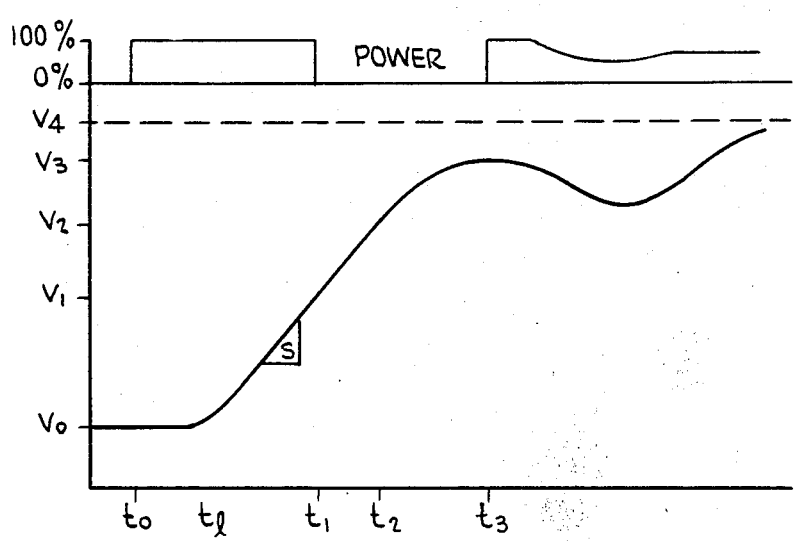
FIG. 3 demonstrates the start-up tune evaluation followed by the excursion into setpoint attributed to the variable overshoot inhibition parameter, and the response of the controlled system to give perturbation and a change in the setpoint in accordance with the self-tuning techniques of the invention.
Figure 4:
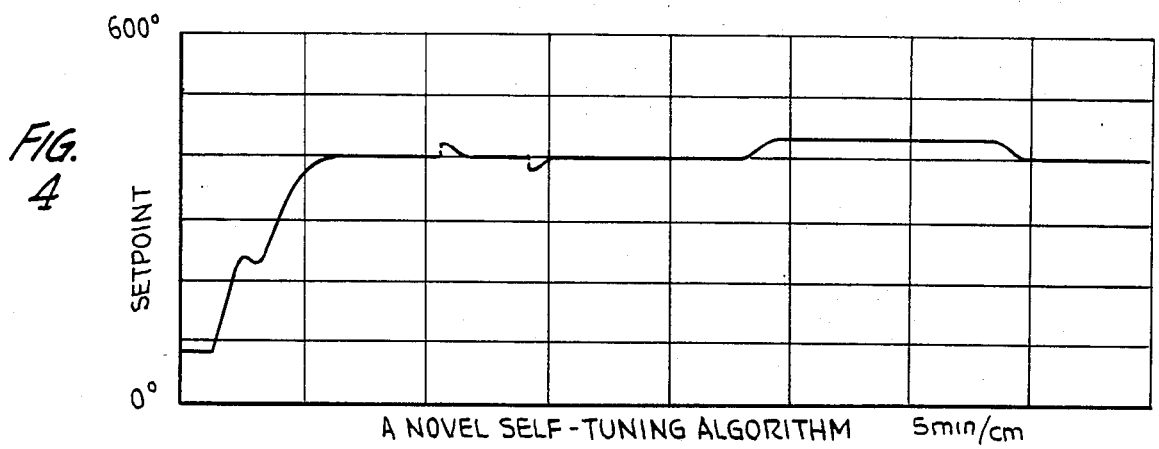
FIG. 4 illustrates a turn initiation procedure of the self-tuning method of the invention placing the temperature control system in an ON/OFF mode for one-quarter cycle, and with a perturbation and setpoint change introduced into the temperature control system.
Figure 5A:
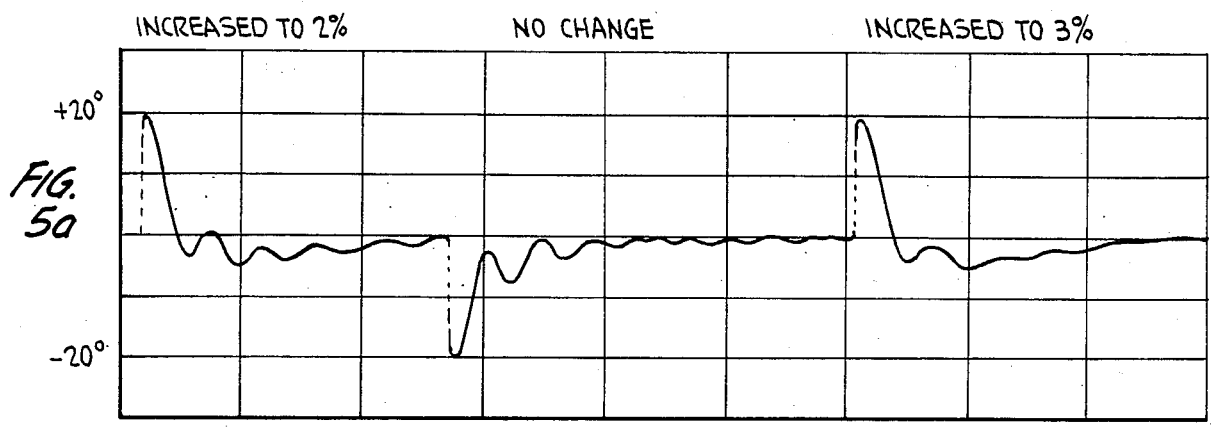
FIGS. 5a–5c illustrates the effect of PB movement in successive 20° perturbations on the response of the temperature control system.
Figure 5B:
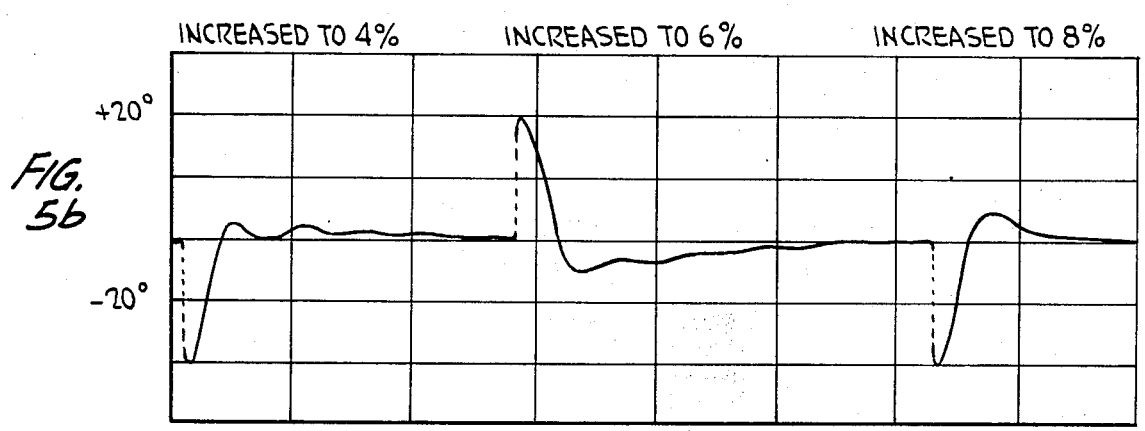
Figure 5C:
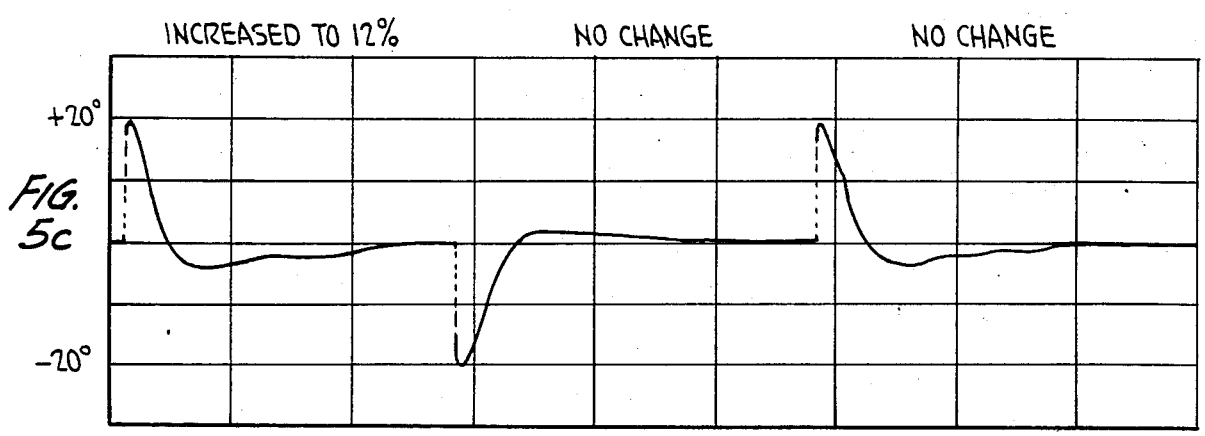
Figure 6:
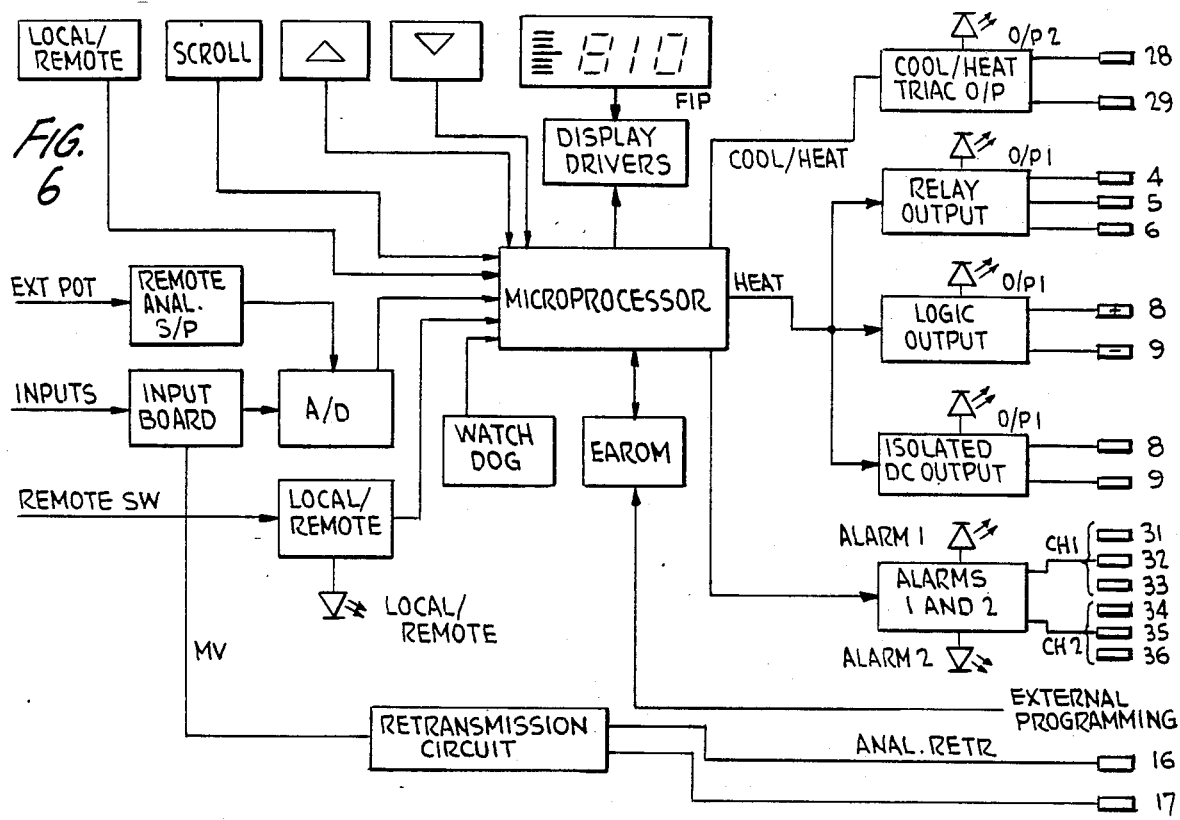
FIG. 6 is a block diagram of the circuitry of a microprocessor-based, three-term controller adapted to be self-tuning in accordance with the invention.
Figure 7:
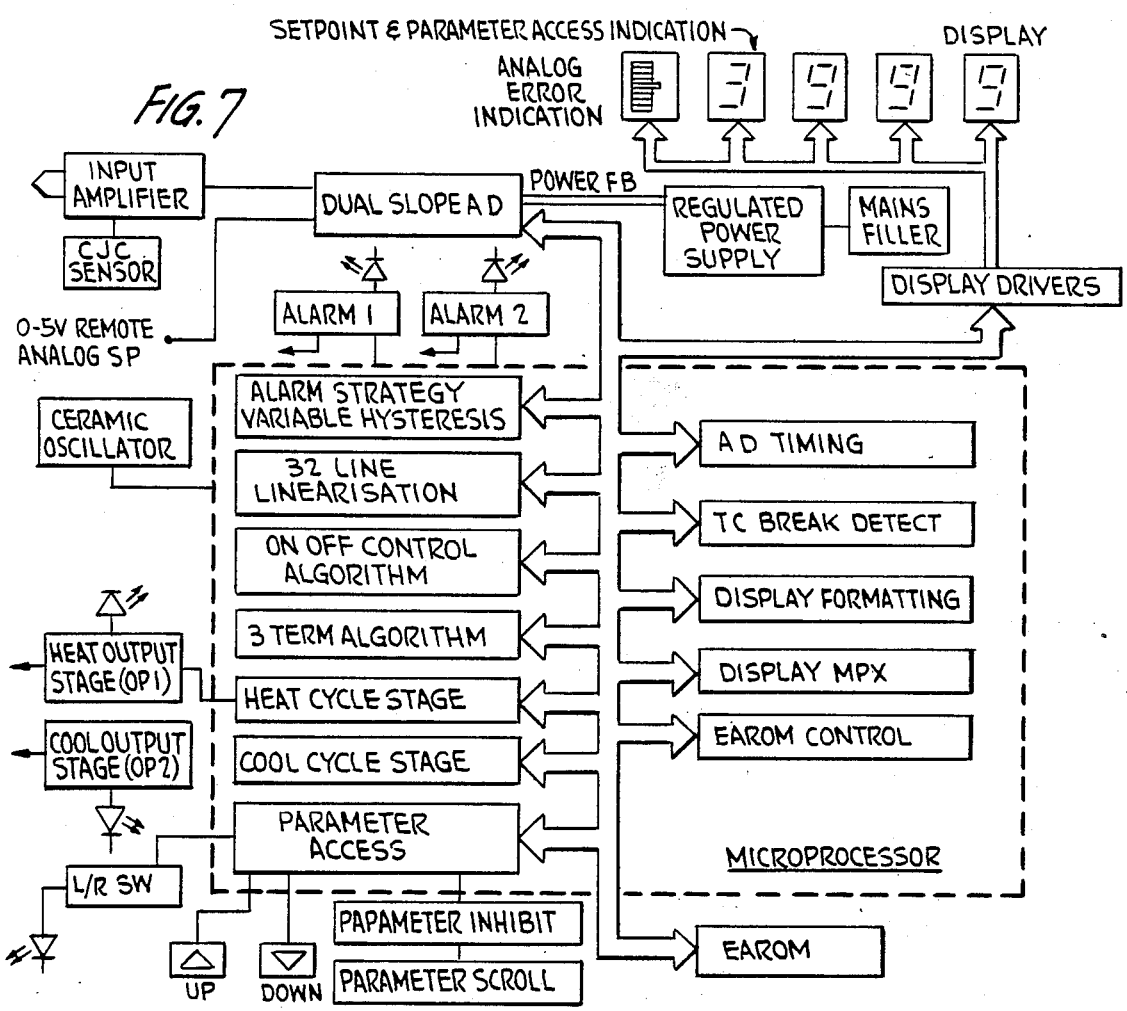
FIG. 7 is a block diagram of the electronically erasable read-only memory (EAROM) forming part of the circuitry of the microprocessor-based controller of FIG. 6.

As has been stated in the introductory portion of the specification, the self-tuning controller of the invention utilizes a microprocessor-based, 3-term controller having the structure and operational capability illustrated in FIGS. 6 and 7. The 810 controller is a microprocessor-based instrument providing three-term control, namely PID control, with digital readout. The digital display is a fluorescent indicator panel (FIP) comprising a nine segment error bar display for analog indication of the proximity to setpoint, and four, seven-segment indicators providing accurate digital indication of process variables.

The 810 controller is adapted to be fitted with two alarms independently adjustable, either full scale, deviation or band types. Each alarm drives a changeover relay and indication is via front panel LEDS.

An electrically alterable read-only memory (EAROM) configures the 810 controller in terms of range, input type, alarm configuration, linearization, etc. A significant feature of the 810 controller is the employment of charge storage characteristics to retain specific information in the event of loss of power, commonly referred to as a non-volatile memory.

Cold junction compensation is provided by a sensor housed within a thermocouple input block.

The 810 controller is designed for easy re-ranging and reconfiguration by the use of interchangeable output boards and by re-programming or exchanging the characteristic EAROM to change the input ranges of the controller.

All operational capablilities of the 810 controller are controlled by four control buttons on the front panel of the instrument. Setpoint is adjusted by UP/DOWN push buttons. Prolonged button depression provides an accelerated display, and single least significant digit changes are obtained by individual button depressions.

Various control parameters such as PB, ITC and DTC, approach, heat/cool cycle times, heat/cool maximum power and relative cool are selected by depression of a scroll bush button. Continuous operation of the scroll button selects the parameters in turn. A parameter value is changed after selection of the scroll push button by operation of a respective UP/DOWN push button. A parameter scroll disable facility is also provided.

A LOCAL/REMOTE operation is afforded by a REMOTE push-button.

Measured value (MV) is displayed during normal operation. Single depression of either the UP or DOWN button causes the setpoint to be displayed. A flashing dot in the display confirms that a parameter value other than MV is being displayed and a timed interlock retains that value, unless a change is made, for a period of four to five seconds. LEDS on the front panel provide indication of alarms one and two, outputs one and two and a remote operation.

The internal configuration is based on the concept of a mother board and plug-in daughter boards for ease of maintenance and re-configuration.

A block diagram of the main components of the 810 controller is illustrated in FIG. 6. The microprocessor controls all the major functions of the 810 controller and interfaces with the operator via FIP, the UP/DOWN buttons and the scroll buttons. The dual-slope analog-to-digital A/D converter accepts inputs and digitizes the input signals under control of the microprocessor.

EAROM provides non-volatile storage of operator set-table variables, control setpoints, control parameters, etc. The significance of the non-volatile storage capabilty of the 810 controller is discussed hereinafter with respect to the description of the self-tuning aspects of the invention.

The A/D converter accepts MV inputs through an input board in the range of zero to ten volts dc and remote analog setpoint signals from the remote analog setpoint board. These signals are measured by the A/D converter and converted to a digital setpoint for remote analog setpoint instruments. The A/D converter also receives an internal power feedback signal from a power supply (not shown) for operation of the relay/logic outputs.

The input signals are switched to the A/D converter by analog switches on the input board to a integrator within the A/D converter. The microprocessor is programmed to access the MV alternately with the power feedback. Every fourth MV cycle the remote analog setpoint is accessed instead of the MV. The dual slope A/D converter operates in three phases. Initially the microprocessor causes the A/D converter to auto-zero by appropriate setting of the analog switches (not shown) to zero the integration circuit within the A/D converter. The integrator now enters an integrating phase for an input signal such as MV during a fixed, timed ramp-down operation at the end of which the microprocessor switches off the analog switch controlling access to the input signal. The A/D integrator now enters a de-integration phase under control of the microprocessor. The microprocessor also sets appropriate analog switches for the power feedback. As mentioned previously, the remote analog setpoint actions the measured value and the power feedback alternately, but every fourth cycle of MV, the remote analog setpoint is actioned instead.

The watchdog circuitry provides a reset for the microprocessor should a fault occur and ensures that the microprocessor is placed in the correct state of operation on start-up.

The EAROM stores all the information necessary to define the 810 controller and includes the data for transducers, linearization, output and alarm definitions and calibration constants. The EAROM can be re-programmed using a field programmer in a manner known to those skilled in the art of such programming. The operation of the EAROM is defined by mode control lines under control of the microprocessor in a manner known to the art. During a "power down" a MAINS FAIL signal inhibits the erase and write condition modes of the EAROM.

The drive signals for the FIP are output from the microprocessor through the display driver circuit.

The pushbuttons are non-latching toggle switches. Operation of the UP pushbutton, Δ, switches an appropriate voltage to the microprocessor. Similarly when the DOWN pushbutton, ∇', is operated a suitable voltage is also switched to the microprocessor. The REMOTE/LOCAL selection pushbutton also connects an appropriate voltage to the microprocessor. The REMOTE/LOCAL facility is toggled by the software and operation of the switch selects either REMOTE or LOCAL. The depression of the SCROLL pushbutton also connects an appropriate voltage to the microprocessor.

The two alarm channels can be used in any configuration.

The input board accepts inputs from thermocouples, three wire resistance thermometers and voltage and current sources. Thermocouple cold junction compensation is provided by a custom thick film circuit (not shown).

An external 0–5 V setpoint signal can be input to the Remote Analog Setpoint board and then input to the A/D converter circuit. An external potentiometer can be connected to the Remote Analog Setpoint circuit to provide an external potentiometer setting of the maximum heat power level.

Relay, logic, isolated dc and triac heat outputs are provided as indicated in FIG. 6. The triac cool output is located on the Cool/Alarm Output board. The triac heat output channel uses the same circuitry as the triac cool output channel on the Cool/Alarm Output board, with the exception of an input circuit. A relay output is obtained by generation of a HEAT INPUT SIGNAL output by the microprocessor. The same HEAT INPUT signal output by the microprocessor is used for a logic output. The circuitry generates two reference voltages, 0 V and +5 V. The HEAT INPUT signal is isolated by an optocoupler and via analog switches selects either the 0 V or +5 V reference voltages to a low pass filter and the output of the filter is amplified to provide the ISOLATED DC output.

The analog retransmission circuit is located on the Remote Analog Setpoint board and the measured value (MV) is zeroed and amplified to produce a 0 V–10 V retransmission signal representinng the span of the 810 controller.

A block diagram of the microprocessor and its relationship to the various input and output functions described above is illustrated in FIG. 7. The input signals are amplified by an INPUT AMPLIFIER and the output thereof is input to a DUAL SLOPE A/D CONVERTER. The digitized output of the DUAL SLOPE A/D CONVERTER is input to the MICROPROCESSOR. The output of a CJC sensor is also input to the INPUT AMPLIFIER.

A 0 V–5 V Remote Analog Setpoint is also input to the DUAL SLOPE A/D CONVERTER. A CERAMIC OSCILLATOR provides the necessary clock and timing signals for operation of the MICROPROCESSOR.

The UP and DOWN pushbuttons are connected to the MICROPROCESSOR along with the PARAMETER SCROLL input. A PARAMETER INHIBIT circuit is available to disable the PARAMETER SCROLL function. The L/R SW is also connected to the PARAMETER ACCESS function circuit. The MICROPROCESSOR includes the following function stages or circuits: the Alarm Strategy variable Hysteresis circuit; the 32 Line Linearization circuit; an On/Off Control Algorithm function; a 3 Term Algorithm; a Heat Cycle Stage output to HEAT OUTPUT STAGE (OP1); a Cool Cycle Stage output to a COOL-OUTPUT STAGE (OP2); a Parameter Access circuit; A/D Timing circuit; a T C Break Detect circuit; a Display Formatting circuit; a Display MPX; and an EAROM Control circuit. The above enumerated circuits are interconnected to one another and to the EAROM DUAL SLOPE A/D CONVERTER, and the DISPLAY DRIVERS by means of the data/command bus as illustrated in FIG. 7.

Power is applied to the various components through a MAINS FILTER and REGULATED POWER SUPPLY to the DUAL SLOPE A/D CONVERTER. The DISPLAY DRIVERS, driven from the data/command bus, control the DISPLAY LEDS with provision for setpoint and parameter access indication and analog error indication as shown in FIG. 7.

The manner in which the 810 controller is modified for self-tuning in accordance with the invention is described hereinafter.

The microprocessor-based, 3-term controller (hereinafter MB3T controller) is set with self-tuning and scroll buttons enabled with standard default parameters in the EAROM. On POWER-UP the self-tuning controller will automatically tune when at half-way to setpoint and automatically and continuously adjust the PB whenever an error of 4° or greater is measured or sensed by the controller. The 4° error is for purposes of explanation only, as it should be understood that the invention can be practiced with other errors than that specifically described herein. Self-tuning may be initiated manually by depressing the scroll button to reveal the "tn" parameter and then depressing the UP button. Self-tuning may be terminated and disabled by depressing the scroll button to reveal the "tn" parameter and then depressing the DOWN button. Self-tuning remains disabled until it is manually initiated again as described above.

On start-up the 810 controller provides heater power to the load from Heat Output Stage (OP1) in FIG. 7. The power is applied full, or at the amount of maximum rated power of the load. Such application of power ensures that the load temperature will approach setpoint in the minimum time. However, the amount of power applied to the load upon start-up is not critical to the invention and any amount of power can be applied depending on the application to which the self-tuning control of the invention is applied. The power to the load is cut off when the temperature thereof reaches one-half of the setpoint temperature. The time for the load temperature to rise to its peak value and the amount of temperature rise are determined as such data is related to the P, I and D parameters of the self-tuning temperature control of the load. The 810 controller then is placed into a normal PID control mode, with an initial value of zero for the ITC, and the new PID values are stored in EAROM. In approximately one-half of an integral time, the 810 controller begins its continuous PB adjustment mode of operation.

The self-tuning controller can also be started initially manually by the operator as follows. When the tuning of the temperature control system is to be started manually the setpoint is first checked. If the measured temperature value is less than half of the temperature setpoint, manual start-up can be initiated. If the 810 controller is calling for cooling power, self-tuning is disallowed. If the measured temperature value is above one-half of temperature setpoint, the 810 controller is caused to enter an ON/OFF control mode with operation of the ON/OFF pushbutton by the operator. The ON/OFF control is entered at the measured temperature with a 3° deadband for one-quarter of a positive cycle. New PID values are then calculated by the 810 microprocessor similar to the calculations performed during automatic start-up outlined above. An initial value of zero for the ITC is assumed when the 810 controller goes into automatic control from a manual start-up.

Continuous PB monitoring and adjustment of the power applied to the load is performed as follows. Whenever an error of 4° or greater is observed, but the error is less than the approach control parameter, the response to the system is tested. If the measured temperature error is corrected in a time less than approximately forty percent of an integral time, the control operation is considered to be underdamped and the PB is increased by one table setting. However, if the measured temperature error does not correct itself within approximately two integral times, the control operation is considered to be overdamped, and the PB is decreased by one table setting. If cooling of the load is called by the 810 controller at the time of the aforementioned decisions concerning underdamping or overdamping, the aforementioned criteria are applied to the cool ratio, but in the reverse or opposite sense.

The self-tuning algorithm of the present invention will reasonably tune any load that has the following characteristics:
(a) the load is continuous in nature, i.e., not a batch process that cycles during the time scale of the response;
(b) the load is reasonably defined by a low pass filter with reasonable dead time and an internal gain of less than unity, and
(c) has a maximum rate of temperature change when full power is applied of one unit per second.

The aforementioned criteria have special application of the following types of loads:
(a) plastic extruder applications including the control of extruder barrel zones and die zones, and
(b) continuous furnaces.

The EAROM stores relevant information for the self-tuning controller. Information is located within the EAROM at specific addresses or numbered locations. In this specification the number system is hexadecimal, denoted by H'xx or Fxx, and it is understood to represent the base 16 numbering system. The EAROM addresses cover the hexadecimal range of FC0 to FFT.

The self-tuning of the 810 controller operates as follows.

1. The bytes FD6, FD7 and the integral are cleared.
2. Byte FD8, which was loaded by the EAROM, is tested and if FD8=H'10', then self-tuning is inhibited.
3. But if FD8 has any other value, then FD8 is set to H'8A' thereby placing the self-tuning algorithm into its first phase with power to the load full on.
4. The control system then undergoes a delay of approximately 15 seconds.
5. The setpoint is obtained from memory (location FC0).
6. The setpoint is divided by two.
7. That one-half setpoint value is compared with current measured value, MV.
8. If that current value of MV is greater than one-half of the setpoint value, self-tuning is inhibited.
9. However, if MV is less than one-half setpoint, "two" is added to one-half setpoint to establish a power cut-off point.
10. The control system then waits until the MV reaches the power cut-off point.
11. At the detection of which the value of the derivative or slope of MV is recorded and the output of the heater power is set to zero and the Integral time counter is started.
12. The MV will continue to rise because of the "coasting" temperature effect of the load temperature. The value of the derivative of MV is tested and the value of the load temperature at which the derivative of MV decreases by 10% is recorded. The incrementation of the Integral counter is continued. The temperature at which the derivative of MV decreased by 10% is identitified as $T_{min}$. A 10% threshold is used to provide an accurate indication of the decrease in the derivative of MV. The lower value of the threshold is determined by the noise present in the control circuitry and also to avoid unnecessary delay in detecting a decrease in the Derivative of MV.
13. The temperature rise of the load continues to be monitored and the incrementation of the Integral time counter also is effected. The maximum temperature obtained is recorded and identified as $T_{max}$.
14. The decrease in the load temperature is then monitored with continued incrementation of the integral time counter. When the monitored temperature decreases to more than 3° below the maximum temperature $T_{max}$, the values of PID are computed in the following manner.
15. The temperature rise Tr is computed from the equation:

$$Tr = T_{max} - T_{min}.$$

The PB table value is obtained from the value of Tr in Table IV below.

TABLE IV

| Proportional Band and Integral Table Values are given by the temperature rise Tr and the Integral counter values. | | | |
| --- | --- | --- | --- |
| Tr or IC | Table Value | Pb | Integral |
| 0 | 1 | 0.75 | 15 |
| 1 | 2 | 1.00 | 30 |
| 2 | 3 | 1.50 | 45 |
| 3 | 4 | 2.00 | 60 |
| 6 | 5 | 3.00 | 90 |
| 10 | 6 | 4.0 | 120 |
| 14 | 7 | 6.0 | 150 |
| 20 | 8 | 8.0 | 200 |

TABLE IV-continued

Proportional Band and Integral Table Values are given by the temperature rise Tr and the Integral counter values.

| Tr or IC | Table Value | Pb | Integral |
|---|---|---|---|
| 28 | 9 | 12.0 | 300 |
| 41 | 10 | 16.0 | 400 |
| 60 | 11 | 25.0 | 600 |
| 85 | 12 | 35.0 | 900 |
| 128 | 13 | 50.0 | 1200 |
| 128 | 14 | 100.0 | 1800 |

In Table I one integral counter unit is equal to approximately six seconds.

The integral table value is obtained from the value set forth in Table I. The derivative table value is obtained by subtracting "three" from the integral table value. This obtains a proper relationship between the Integral and Derivative time constants.

16. The selected table values are stored in respective locations in EAROM.

17. The Integral term is initialized to zero and the value of the integral counter is stored.

18. The 810 controller then enters a normal PID control mode.

19. The continuous adaptation mode is entered after a delay equal to the value of the time incremented of twice the integral counter value.

When the 810 controller is in the three term PID control mode, the value of the temperature error signal is continuously monitored. If the error becomes greater than 3°, but within an approach control setting, the integral counter is incremented. The temperature error is continued to be monitored and if the value of the integral counter becomes greater than four times the value stored in the integral counter when the integral term was initialized to zero, or the value of start-up, or from manually intiiated tuning, the response is arbitrarily considered to be overdamped. If the error is corrected to within 1° of setpoint in a time less than 80% of the count stored in integral counter is step 17, the response of the control system is arbitrarily considered to be underdamped.

With an overdamped response, the PB is decreased by one table value or setting in the event that heater power is being called for by the 810 controller. If cooling power is being called for, the cool ratio is increased by one table setting. In the event of an underdamped response the PB is increased by one table setting in the event that the 810 controller is calling for heater power. In the event that cooling power is required, the cool ratio is decreased.

The new parameters are then stored in their respective locations within EAROM. A delay equal to twice the time incremented in the integral time counter occurs before the tuning algorithm described above is repeated again.

The 810 controller can enter a self-tuning mode by manual depression of the scroll button as follows.

1. The scroll button is depressed until the operator detects that "tn" appears on the front panel display.

2. The operator then depresses the UP button, location FD8 is set to H'06' and the setting is stored in EAROM location 24 to enable self-tuning.

3. The MV is compared with setpoint temperature and if MV is less than one-half setpoint, the self-tuning procedure is resumed at step nine as described above. However, if the MV is greater than one-half of setpoint, "three" is subtracted from the current MV.

4. The power is reduced to zero and the power OFF point is recorded as the power turn ON point.

5. The MV is monitored until it drops to the stored power turn ON point and when it does, "two" is added to the MV and the resultant value stored as the power cut-off point. The power to the load is then turned on full.

6. The start-up procedure is resumed at step 10 as described above.

7. If the DOWN button has been depressed, tuning is disallowed and the location FD8 in the EAROM is set to H'10'. That set value is then stored in the EAROM to inhibit self-tuning.

Figure 8B:
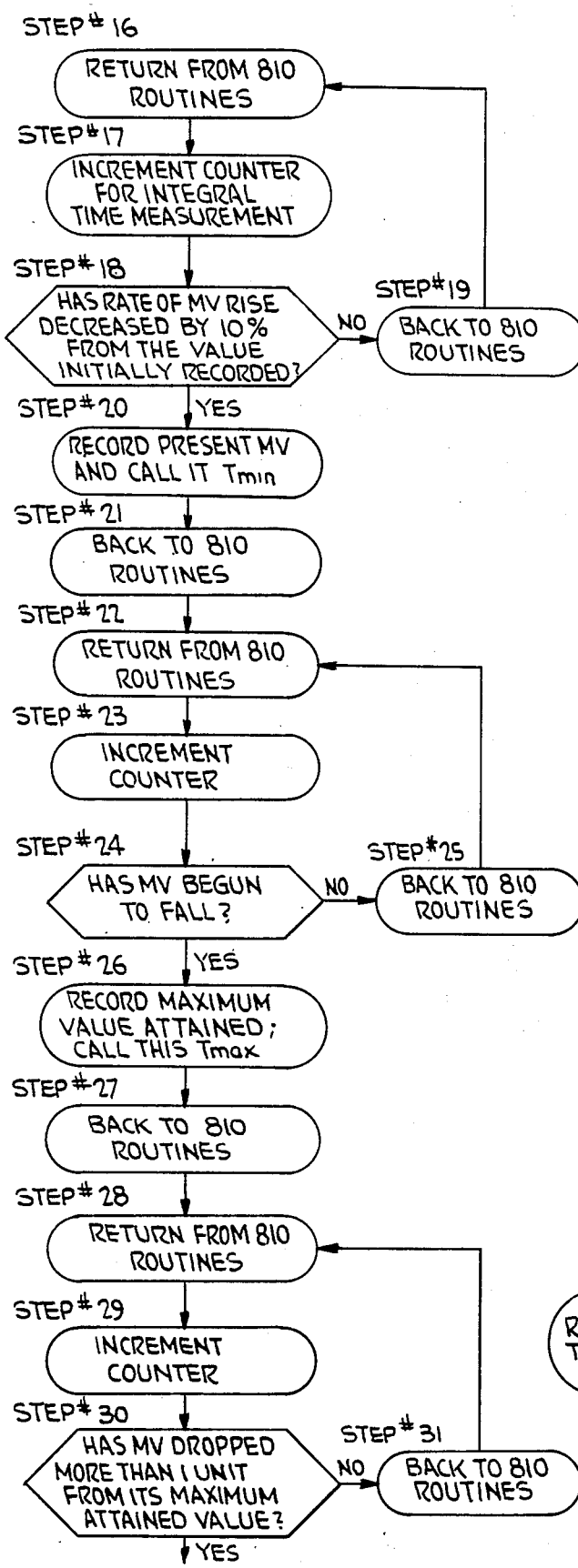

The following is a description of the method of the invention taken with reference to the self-tuning algorithm flow diagrams of FIGS. 8A-8H. FIG. 8A illustrates an exemplary embodiment of the start-up tune segment of the self-tuning algorithm. In step No. 1 the instrument enters a "power-up" mode during which various initiation and equipment warm-up procedures may be utilized to make sure that the instrument is ready to operate as contemplated. None of the specific initialization operations are of significance to the present invention as such procedures are primarily concerned with the circuitry of the controller utilized in conjunction with the self-tuning portion of the inventive method and apparatus, in this instance the 810 controller.

In step No. 2 a determination is made as to whether or not the self-tuning mode is enabled. If not, the self-tuning mode is not entered. If self-tuning is enabled, then the power to the load is turned to "full-on" in step No. 3. The instrument then enters a 15 second delay to enable the Measured Value MV to settle in step No. 4. In step No. 5, the setpoint stored in the memory of the 810 controller is obtained. The setpoint value is then divided by "2" in step No. 6. A determination is made as to whether the MV is greater than the setpoint divided "2" in step No. 7. If such a comparison of the MV and the setpoint reveals that the MV is greater, then the self-tuning mode does not proceed. When the aforementioned comparision indicates that the MV is not greater than the setpoint divided by "2", the self-tuning algorithm proceeds to step No. 8 where "2" is added to the value of ½ the setpoint to establish a power cut-off point. The program then returns to the 810 controller routines in step No. 9, which for the most part such routines form no part of the present invention.

Periodically the program returns from the 810 controller routines in step No. 10 to determine in step No. 11 whether the MV has reached the power cut-off point determined in step No. 8. If the power cut-off point has not been reached, then the program reverts back to the 810 controller routines as indicated by step No. 12. When the MV reaches the power cut-off point, the outpower power to the load is returned to zero in step No. 13. The rate of rise of the MV is then ascertained in step No. 14, subsequent to which the program returns to the 810 controller routines in step No. 15.

With reference to FIG. 8B, subsequent to return to the self-tuning algorithm in step No. 16, the counter for Integral time measurement is incremented in step No. 17. A determination is then made as to whether the rate of the MV rise has decreased from 10% in step No. 18 from the value calculated and recorded in step No. 14. If the rate of rise of the MV has not so decreased then the program returns to the 810 controller routines in step No. 19.

After return from the 810 controller routine, steps Nos. 16-18 are repeated and subsequent determinations of the decrease in the rise of the MV and when the criteria enumerated in step No. 18 is obtained, then the algorithm proceeds to step No. 20 where the present MV is recorded and designated as $T_{min}$, subsequent to which the self-tuning algorithm returns to the normal 810 controller routines in step No. 21.

Upon return to the self-tuning algorithm in step No. 22, the Integral counter is subsequently incremented in step No. 23. In step No. 24, a determination is made as to whether the MV has begun to fall. If not, then the program returns to the 810 controller routines via step No. 25 and the self-tuning algorithm returns to step No. 23. When a determination is made in step No. 24 that the MV has begun to fall, the self-tuning program continues with the recording of the maximum value of MV attained in step No. 26, subsequent to which the program returns to the 810 controller routines in step No. 27.

Upon return to the self-tuning algorithm in step No. 28, the Integral counter is incremented in step No. 29 and then a determination is made in step No. 30 as to whether the MV has dropped more than one unit from the maximum value recorded in step No. 26 and if such determination in step No. 30 is negative, then the program returns to the 810 controller routines via step No. 31. Steps Nos. 28-30 are then repeated.

Figure 8C:
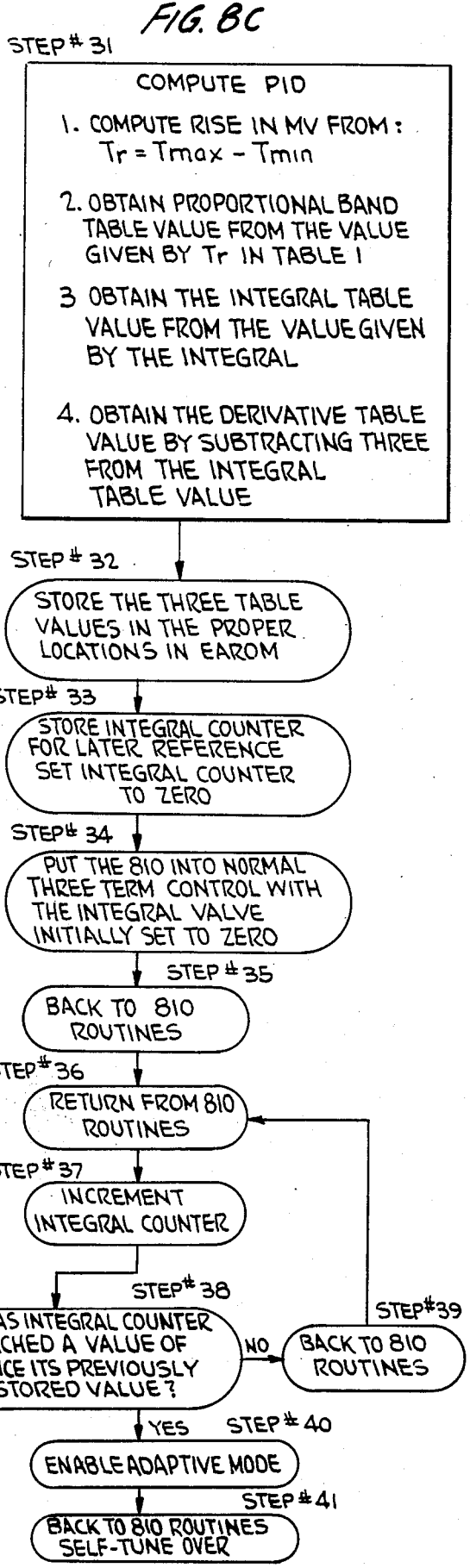

The description of the operation of the self-tuning algorithm continues with the program steps illustrated in FIG. 8C. In step No. 31 the following computations are made:
1. Compute the rise in MV from $T_r = T_{max} - T_{min}$.
2. The proportional band table value is obtained from the value given by $T_r$ in Table 1.
3. The Integral table value is obtained from the value given by the Integral.
4. The Derivative table value is obtained by subtracting three from the Integral table value.

The three table values are then stored in the proper locations in the EAROM in step No. 32 and the value in the Integral counter is also stored for later reference. The Integral counter is then set to zero in step No. 33. The 810 controller is then placed in its normal three term control mode with the Integral value initially set to zero in step No. 34 of the self-tuning algorithm, subsequent to which the program returns to the normal 810 controller routines via step No. 35.

Upon return to the self-tuning algorithm in step No. 36 the Integral counter is incremented in step No. 37 and then a determination is made as to whether the Integral counter has reached a value of twice its previously stored value in step No. 38.

If the comparison in step No. 38 is negative, then the self-tuning algorithm returns to the 810 controller routines via step No. 39, whereupon steps No. 36-38 of the self-tuning program are repeated. When the integral counter attains a value of twice its previously stored value the Adaptive Mode is enabled in step No. 40 subsequent to which the self-tuning algorithm is completed and the program returns to the 810 controller routines.

Figure 8D:
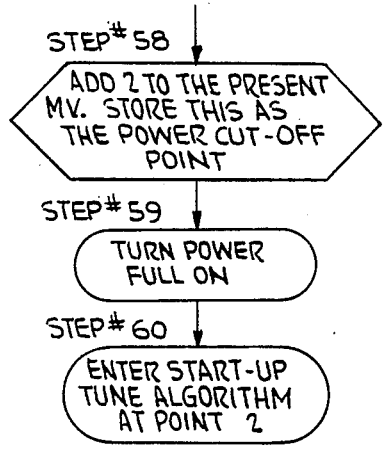
Figure 8E:
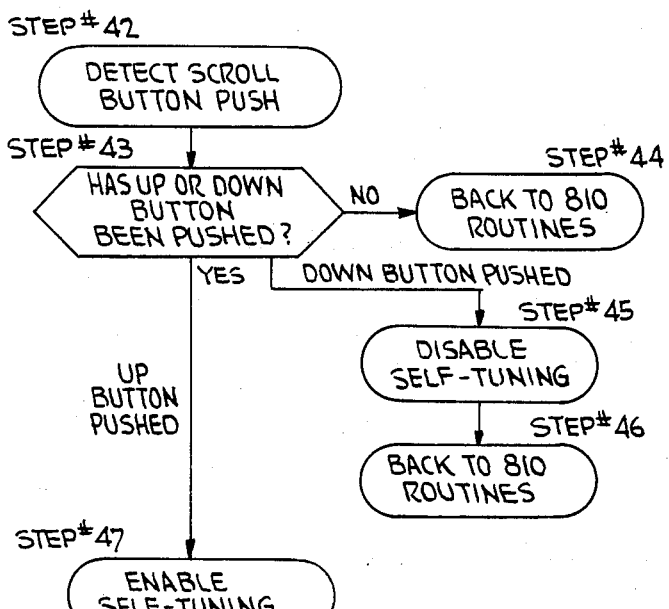
Figure 8E:
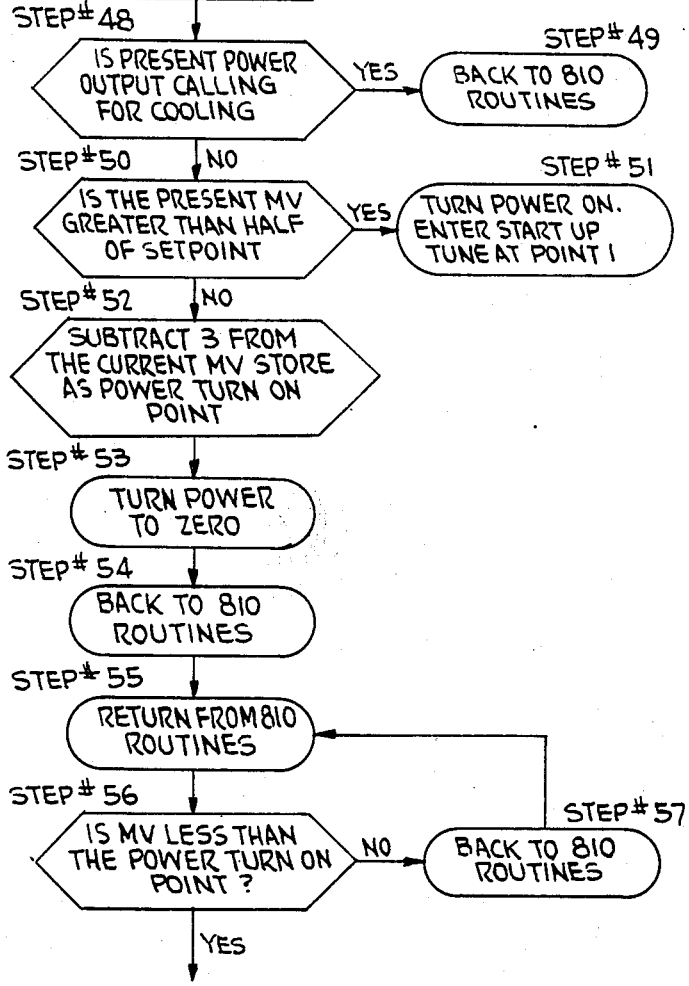

FIGS. 8D and 8E illustrate an exemplary embodiment of the Manual Button Push Initiation portion of the self-tuning algorithm. In step No. 42 the Detect Scroll Button may be actuated and in step No. 43 a determination is made as to whether the Detect Scroll Button has been actuated. If the up Detect Scroll Button has not been actuated the self-tuning algorithm returns to the 810 controller routines via program step 44. If the the down Detect Scroll Button has been actuated the self-tuning mode of operation is disabled in step No. 45 and the self-tuning algorithm returns to the 810 controller routines via step No. 46. However, if the up Detect Scroll Button has been actuated, then the self-tuning algorithm proceeds to step No. 47 where self-tuning is enabled. A determination is then made as to whether the present load output is calling for cooling power and if such determination is "yes" then the program returns to the 810 controller routines via step No. 49. If cooling power is not being called for, then a determination is made as to whether the present MV is greater than ½ of setpoint. Power to the load is turned on if the comparison in step No. 50 is yes whereupon the self-tuning program enters "start-up Tune" at point 1 shown in FIG. 8A.

If the present MV is not ½ of setpoint, then "3" is subtracted from the current MV and that result is stored as a "power turn on" point by step 52. Subsequently the power is reduced to zero by step No. 53 and then the program returns to the 810 controller routines via step No. 54.

Upon return to the self-tuning algorithm in step No. 55, a determination is made that MV is less than the "power turn on" point. If the determination is negative, then the program returns to the 810 controller routines via step No. 57. If the determination is positive, then the program proceeds to step No. 58 (illustrated in FIG. 8E) where "2" is added to the present MV and the result is stored as the "power cut-off" point. Power to the load is then turned full on in step No. 59 subsequent to which the self-tuning algorithm enters the program at the "start-up Tune" algorithm at point 2 illustrated in FIG. 8A.

Figure 8H:
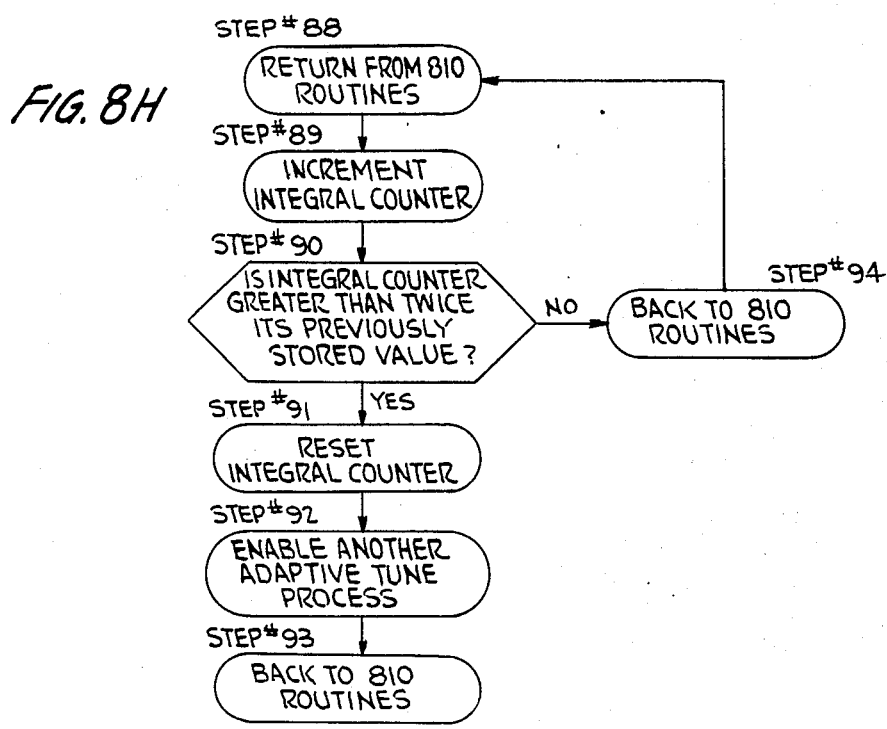

The Adaptive mode of te self-tuning algorithm is illustrated in FIGS. 8F-8H. The self-tuning algorithm returns from the 810 controller routines through step No. 61 and enters step No. 62 where a computed error MV-SP is calculated and a determination is then made in step No. 63 of whether the computer error is greater than "3". If the determination is negative, then the program returns to the 810 controller routines via step No. 64 and the program goes back to step No. 61, whereupon steps Nos. 61-63 are repeated. If the computed error determination in step No. 63 is positive, then the algorithm proceeds to determine in step No. 65 whether the error is within a predetermined approach control parameter. If not, then the program returns to the 810 controller routines and program steps Nos. 61-63 are repeated. If the computed error is within the approach control parameter, then the program proceeds via step No. 67 to increment the Integral counter subsequent to which the algorithm returns to the 810 controller routines via step No. 68.

The program returns to the self-tuning algorithm in step No. 69 to increment the Integral counter in step No. 70. A determination is then made as to whether the number stored in the Integral counter is greater than 4 times its previously stored value. If that determination is positive the algorithm proceeds to step No. 72 and it is assumed therein that the response is underdamped. A determination is then made as to whether or not cooling power is being applied in step No. 73. If that determination is negative, then the program proceeds to step No. 85 (illustrated in FIG. 8G) wherein the Cool Ratio is increased by one setting. The program then proceeds to step No. 86 wherein the Integral counter is reset subsequent to which the program returns to the 810 controller routines in step No. 87.

However, if the cooling output is not being required, the program proceeds to step No. 81 wherein the Proportional Band is decreased by one setting subsequent to which the program proceeds to steps Nos. 86 and 87 previously described.

If the determination in step No. 71 is that the number stored in the Integral counter is nott greater than 4 times its previously recorded value, then the algorithm proceeds to step No. 74 where a determination is made as to whether the computed error has been decreased to less than "1". If not, then the algorithm process to step No. 87 where the program returns to the 810 controller routines. But if the computed error has been decreased to less than one, then the algorithm proceeds to step No. 75 where a determination is made as to whether the Integral counter value is less than 80% of its previously stored value. If that determination is negative, then the program proceeds to step No. 82 wherein the Integral counter is reset whereupon the algorithm returns to the 810 controller routines via step No. 83.

If the determination in step No. 75 is positive, then the algorithm proceeds to step No. 76 where it is assumed that the response is underdamped. Subsequently, a determination is made as to whether cooling output is being applied to the load. If no cooling output is being applied, the Proportional Band is increased by one table setting in step No. 84, and the algorithm proceeds to step No. 79 where the Integral counter is reset and then the algorithm returns to the 810 controller routines via step No. 80.

If the determination in step No. 77 is that cooling output is being applied to the load, then the "cool ratio" is decreased by one table setting in step No. 78 and the algorithm proceeds to steps Nos. 79 and 80 where the Integral counter is reset and the program returns to the 810 controller routines, respectively.

In step No. 88 the algorithm returns from the 810 controller routines and proceeds to increment the Integral counter in step No. 89. A determination is then made as to whether the number in the Integral counter is greater than twice its previously stored value in step No. 90. If such determination is negative, then the program returns to the 810 controller routines via step No. 94 and steps Nos. 88–90 are repeated. If the determination is step No. 90 is positive, then the program continues to step No. 91 where the Integral counter is reset subsequent to which the program enables another adaptive tune process in step No. 92 and then returns to the 810 controller routines via step No. 93.

Figure 9:
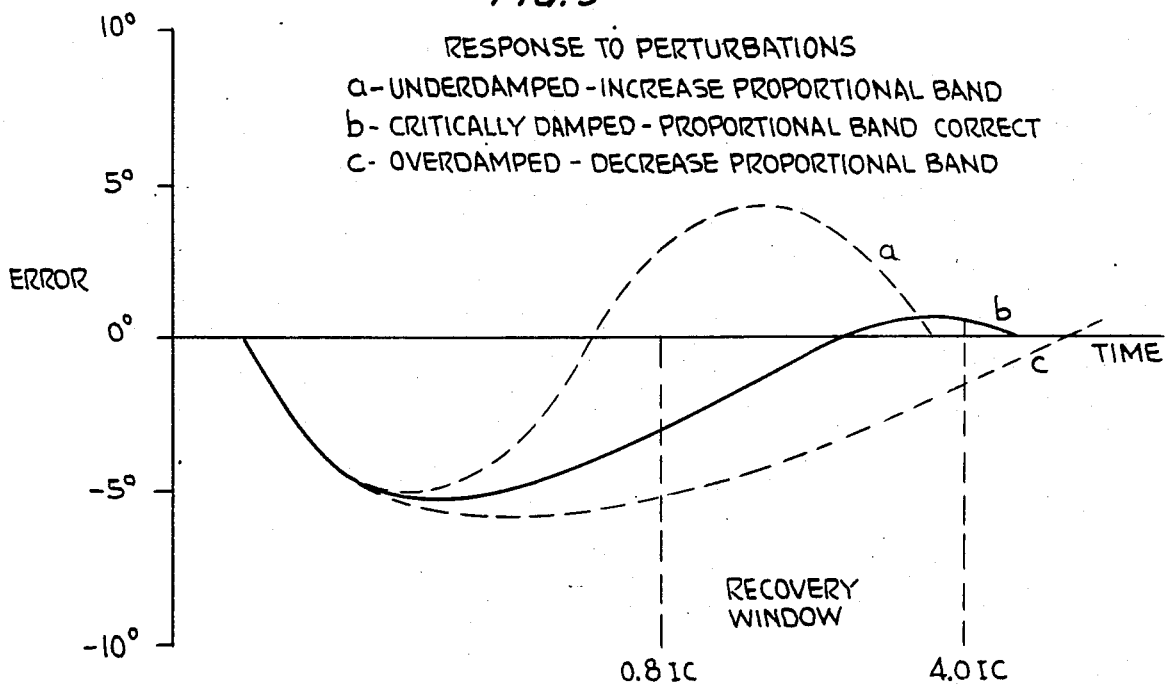
FIG. 9 illustrates underdamped, critically damped and overdamped responses to perturbations and the recovery window forming a part of the invention.

FIG. 9 illustrates the computed error vs. time for three response curves of the controlled load with respect to perturbations. Curve a represents an underdamped response; curve b shows a critically damped response; and curve c illustrates an overdamped response. The recovery window of the self-tuning technique is established between 0.8 IC (Integral Time) and 4.0 IC. If the self-tuning program determines that the control is underdamped because the system has not returned to the setpoint within the recovery window, then the PB is increased as has been previously described. However, if the system has returned to the setpoint within the recovery window, the system is judged to be critically damped and the PB is correct. Finally, if the system has not returned to the setpoint in the recovery window and the system response is determined to be as shown by curve c, then the system is judged to be underdamped and the PB is decreased as has been described previously. The recovery window is a unique feature of the invention and enables the system parameters to be readily altered to optimize the system response.

It is to be expressly understood that although the above description is taken with respect to the temperature control of a load, the self-tuning concepts of the invention are applicable to any other controllable parameters that have been subject to control using classical feedback control techniques, such as pressure, speed, position, etc.

Those skilled in the control art will recognize that the above described exemplary embodiment of a self-tuning control system can be modified in many ways to accommodate various and sundry different applications in temperature control as well as the control of other parameters using the principles described herein. However, the scope of the invention is to be measured by the following claims taking into consideration the range of equivalents for the elements of the invention.

What is claimed is:

1. A method for self-tuning a Proportional-Integral-Derivative controller for controlling at least one characteristic of a load to a predetermined setpoint SP from calculated values of Proportional Band PB, Integral Time Constant ITC and Derivative Time Constant DTC, comprising:

applying power to the load;

establishing a cut-off point to remove power to said load;

upon detection of said power cut-off point, determining the slope of a Measured Value MV of said at least one load characteristic and starting an integral time counter;

determining at least one value $X_{min}$ at which the value of MV decreases by a fixed percentage;

determining the maximum value $X_{max}$ of said at least one load characteristic;

calculating the values of PB, ITC and DTC by determining the rise $X_r = X_{max} - X_{min}$ and determining PB and ITC from a stored table relating $X_r$ to PB and the value incremented in the integral counter;

determining the DTC value from the value incremented in the integral counter;

storing the values of PB, ITC and DTC in a nonvolatile storage means; and controlling the load with said PB, ITC and DTC values.

2. A method for self-tuning as set forth in claim , further comprising:

monitoring the difference between MV and setpoint with the controller in three term PID control to determine an error $X_e$;

if said error $X_e$ becomes greater than a predetermined value, increasing said integral counter;

if the incremented value of said integral counter exceeds a predetermined value before reduction of said error $X_e$ to a given value, changing PB by a fixed amount with the controller requiring a given power;

if the incremented count in said integral counter is less than a fixed percentage of the count stored in said counter in said step of calculating before reduction of said error $X_e$ to said given value, changing the PB by a fixed amount with a given power required by said contoller; and storing the changed PB, ITC and DTC values in said storage means.

3. A method for self-tuning as set forth in claim 1 wherein the detection of said power cut-off point includes establishing a predetermined cycle of oscillation of said at least one load characteristic at a predetermined point between said setpoint and an initial point of said at least one load characteristic, and calculating the PB, ITC and DTC values from the amplitude and period of oscillation of said at least one load characteristic.

4. A method of self-tuning a controller as set forth in claim 1 further comprising calculating the PB, ITC and DTC values by placing the controller in ON-OFf control for said predetermined cycle and subsequently calculating the PB, ITC and DTC values from the amplitude and period of oscillation of said at least one load characteristic.

5. A method for self-tuning a controller as set forth in claim 1 further comprising monitoring the control response to perturbations and altering the PB setting if said at least one load characteristic does not reach setpoint within a particular time frame with respect to the time counted by said integral time counter with the controller demanding a particular type of control power at the time of a perturbation.

6. A method for self-tuning a controller as set forth in claim 1, further comprising:

monitoring the difference between MV and setpoint with the controller in three term PID control to determine an error $X_e$;

if said error $X_e$ becomes greater than a prederemined value, increasing said integral counter;

if the incremented value of said integral counter exceeds a predetermined value before reduction of said error $X_e$ to a given value, changing PB by a fixed amount with the controller requiring a given power;

if the incremented count in said integral counter is less than a fixed percentage of the count stored in said counter in said step of calculating before reduction of said error $X_e$ to said given value, changing the PB by a fixed amount with a given power required by said controller;

storing the changed PB, ITC and DTC values in said storage means; and said step of detecting said power cut-off point includes establishing a predetermined cycle of oscillation of said at least one load characteristic at a predetermined point between said set-point and an initial point of said at least one load characteristic, and calculating the PB, ITC and DTC values from the amplitude and period of oscillation of said at least one load characteristic.

7. A method of self-tuning a controller as set forth in claim 6, further comprising calculating the PB, ITC and DTC values by placing the controller in an ON-OFF control for said predetermined cycle and subsequently calculating the PB, ITC and DTC values from the amplitude and period of oscillation of said at least one load characteristic.

8. A method of self-tuning a controller as set forth in claim 6, further comprising the step of monitoring the control response to perturbations and altering the PB setting if said at least one load characteristic does not reach setpoint within a particular time frame with respect to the time counted by said integral time counter with the controller demanding a particular type of control power at the time of a perturbation.

9. A method of self-tuning a controller as set forth in claim 7, further comprising the step of monitoring the control response to perturbations and altering the PB setting if said at least one load characteristic does not reach setpoint within a particular time frame with respect to the time counted by said integral time counter with the controller demanding a particular type of control power at the time of a perturbation.

10. A method for self-tuning a Proportional-Integral-Derivative controller for controlling at least one characteristic of a load to a predetermined setpoint SP, and having a start-up procedure, comprising:

applying power to said load with self-tuning control enabled;

obtaining the setpoint from a storage means associated with the controller;

dividing said setpoint by a predetermined factor;

determining if the present measured value MV of said at least one characteristic of a load is greater than the divided setpoint value; and adding a predetermined number to the divided setpoint value to establish a power cut-off point with the present MV values less than the divided setpoint value.

11. A method of self-tuning as set forth in claim 10 further comprising delaying the start-up procedure a fixed period of time subsequent to the application of power, said predetermined factor and said predetermined number are each "2".

12. A method of self-tuning a controller as set forth in claim 10, further comprising returning the start-up procedure to a predetermined routine for controlling said at least one load characteristic subsequent to said step of adding; and re-entering said start-up procedure from said predetermined routine upon at least one of manual command and in response to a sensed condition of said at least one load characteristic.

13. A method of self-tuning as set forth in claim 12 further comprising determining if the MV has reached said power cut-off point; removing power from said load with said MV at said power cut-off point, and returning the start-up procedure to said predetermined routine with said MV less than said power cut-off point; and with said power removed from said load, recording the rate of rise of MV; and returning said start-up procedure to said predetermined routine.

14. A method for self-tuning a controller as set forth in claim 13, further comprising:

re-entering the self-tuning algorithm from said predetermined control routine;

incrementing an integral time counter for integral time measurement;

recording present MV value and designate it $X_{min}$ with rate of rise of MV decreasing a predetermined percentage of the MV value initially recorded;

recording maximum value of $X_{max}$ of MV;

computing the Proportional Band PB, Integral Time Constant ITC and Derivative Time Constant DTC values with MV less than a predetermined amount from $X_{max}$ by the following:

computing the rise in MV from $X_r = X_{max} - X_{min}$;

obtaining the PB value from a table stored in memory using $X_r$;

obtaining the ITC value from said stored table;

obtaining the DTC value by subtracting a predetermined amount from said ITC table value;

storing the computed PB, ITC and DTC values;

controlling the controller with normal three term control with the ITC value initially set to zero; and enabling an adaptive control mode with the integral counter storing a value a given multiple of the value previously stored therein for automatically self-tuning the controller.

15. A method of self-tuning a controller as set forth in claim 14, further comprising returning the program to a predetermined routine for controlling the controller and re-entering the self-tuning programmed control at least subsequent to at least one of the steps of incrementing said integral time counter, the recording of $X_{min}$, the recording of $X_{max}$, controlling the controller with normal three term control, and enabling said adaptive control mode.

16. A method of self-tuning a controller as set forth in claim 15, further comprising determining the decrease in the rate of rise of MV to said predetermined percentage;

determining a decrease in said MV prior to recording $X_{max}$;

determing a drop in MV more than a predetermined amount before computing the PB, ITC and DTC values;

storing the count in said integral counter with the computation of the PB, ITC and DTC values and setting the integral counter to zero;

incrementing the integral counter to enable the adaptive control mode.

17. A method of self-tuning a controller as claimed in claim 10, further comprising:

computing errors MV−SP;

determining if error MV−SP is greater than a predetermined error criteria and within a predetermined approach control parameter and incrementing said integral counter;

determining if the count in said integral counter is greater or less than a predetermined multiple of the count previously stored therein;

if the integral count is less than said predetermined multiple, classifying the controller response as being overdamped and if the integral count is greater than said predetermined multiple, classifying the controller response as being underdamped;

if an overdamped response, decreasing the PB setting by a fixed amount, and with an underdamped response increasing the PB by a fixed amount;

determining if the count in said integral counter is greater than a second predetermined multiple of the count previously stored therein; and if the count in said integral counter is greater than said second predetermined multiple, repeating the steps of said adaptive mode control.

18. A method as set forth in claim 17, further comprising returning the self-tuning control to a predetermined routine for controlling the controller, and re-entering the self-tuning programmed control at least subsequent to at least one of the steps of determining if error MV−SP is greater than a predetermined error criteria and within a predetermined approach control parameter, decreasing or increasing the PB setting by a fixed amount, determining if the count in said integral counter is greater than a second predetermined multiple, and repeating the steps of said adaptive mode control.

19. A method as set forth in claim 18 wherein the step of classifying the controller response as being underdamped includes determining if the count in said integral counter is less than a predetermined percentage of its previously stored value with error MV−SP being less than "1";

if error MV−SP is greater than "1" returning the self-tuning control to a predetermined routine for controlling said at least one load characteristic; and if the count in said integral counter is less than "1" classifying the controller response as being underdamped.

20. Apparatus for self-tuning a Proportional-Integral-Derivative conroller for controlling at least one characteristic of a load to a predetermined setpoint SP from calculated values of Proportional Band PB, Integral Time Constant ITC and Derivative Time Constant DTC, comprising;

means for applying power to the load;

means for establishing a cut-off point to remove power to said load;

means for determining the slope of the Measured Value MV of said at least one load characteristic and starting an integral time counter upon occurrence of said power cut-off point, determining at least one value $X_{min}$ at which the value of MV decreases by a fixed percentage, and determining the maximum value $X_{max}$ of said at least one load characteristic;

means for calculating the values of PB, ITC and DTC by determining the rise $X_r = X_{max} - X_{min}$ and determining PB and ITC from a stored table relating $X_r$ to PB and the value incremented in the integral counter; and determining the DTC value from the integral value;

means for storing the values of PB, ITC and DTC in a nonvolatile storage means; and means for controlling the load with said PB, ITC and DTC values.

21. The apparatus as set forth in claim 20, further comprising:

means for monitoring the difference between MV and SP with the controller in three term PID control to determine an error $X_e$;

an integral counter for counting with said error $X_e$ greater than a predetermined value;

said calculating means changing PB by a fixed amount with the controller requiring a given power and the incremented value of said integral counter exceeding a predetermined value before reduction of said error $X_e$ to a given value;

said calculating means changing PB by a fixed amount with a given power required by said controller with the incremented count in said integral counter less than a fixed percentage of the count stored in said counter before reduction of said error $X_e$ to a said given value; and said storing means storing the changed PB, ITC and DTC values in said storage means.

22. The apparatus for self-tuning as set forth in claim 20, wherein said establishing means establishes a predetermined cycle of oscillation of said at least one load characteristic at a predetermined point between said setpoint and an initial point of said at least one load characteristic, and said calculating means calculating the PB, ITC and DTC values from the amplitude and period of oscillation of said at least one load characteristic.

23. The self-tuning controller apparatus as set forth in claim 20, wherein said calculating means calculates the PB, ITC and DTC values to set the controller in an ON-OFF control mode for said predetermined cycle, and subsequently calculates the PB, ITC and DTC parameters from the amplitude and period of oscillation of said at least one load characteristic.

24. The self-tuning controller as set forth in claim 20, further comprising means for monitoring the control response to perturbations, and said calculating means changes the PB setting if said at least one load characteristic does not reach setpoint within a particular time frame with respect to the time counted by said integral time counter with the controller demanding a particular type of control power at the time of a perturbation.

25. The self-tuning controller as set forth in claim 20, further comprising means for monitoring the difference between MV and SP with the controller in three term PID control to determine an error $X_e$; and wherein the count in said integral counter is increased if said error becomes greater than a predetermined value;
   said calculating means changing PB by a fixed amount with the controller requiring a given power with the incremented value of said integral counter exceeding a predetermined value before reduction of said error $X_e$ to a given value;
   said calculating means changing the PB by a fixed amount with a given power required by said controller, with the incremented count in said integral counter less than a fixed percentage of the count stored in said counter before reducing said error $X_e$ to said given value;
   said storing means storing the changed PB, ITC and DTC values; and
   said means for establishing provides a predetermined cycle of oscillation of said at least one load characteristic at a predetermined point between said setpoint and an initial point of said at least one load characteristic; and
   said calculating means calculates the PB, ITC and DTC values from the amplitude and period of oscillation of said at least one load characteristic.

26. The self-tuning controller as set forth in claim 25, wherein said calculating means calculates the PB, ITC and DTC values to place said controller in an ON-OFF control mode for said predetermined cycle, and said calculating means subsequently calculating the PB, ITC and DTC values from the amplitude and period of oscillation of said at least one load characteristic.

27. The self-tuning controller as set forth in claim 25, wherein said monitoring means further monitors the control response to perturbations, and said calculating means changes the PB setting if said at least one load characteristic does not reach setpoint within a particular time frame with respect to the time counted by said integral time counter with the controller demanding a particular type of control power at the time of a perturbation.

28. The self-tuning controller as set forth in claim 25, wherein said calculating means calculates the PB, ITC and DTC values with the controller in an ON-OFF control mode for said predetermined cycle, and subsequently calculating the PB, ITC and DTC values from the amplitude and period of oscillation of said at least one load characteristic.

29. The self-tuning controller as set forth in claim 28, wherein said monitoring means monitors the control response to perturbations, and said calculating means changes the PB setting if said at least one load characteristic does not reach setpoint within a particular time frame with respect to the time counted by said integral time counter with the controler demanding a particular type of control power at the time of a perturbation.

30. A Proportional-Integral-Derivative self-tuning controller for controlling at least one characteristic of a load to a predetermined setpoint SP, comprising:
   means for storing at least the values of Proportional Band, Integrated Time Constant ITC, Derivative Time Constant DTC and setpoint SP;
   calculating means for dividing the setpoint SP stored in said storing means by a predetermined factor;
   means for sensing if the present Measured Value MV of the at least one load characteristic is greater than the dividend produced by said dividing means;
   said calculating means adding a predetermined number to the divided setpoint value to establish a power cut-off point with the present MV values less than the divided setpoint value; and
   further comprising means for controlling the self-tuning controller to perform a predetermined routine for controlling said at least one load characteristic subsequent to said calculating means adding.

31. The self-tuning controller as set forth in claim 30, further comprising means for delaying the start-up of the self-tuning controller for a fixed period of time subsequent to the application of power, said predetermined factor and said predetermined number are each "2".

32. The self-tuning controller as set forth in claim 31, further comprising means for sensing said at least one load characteristic;
   means for determining if the MV has reached said power cut-off point;
   means for controlling to return the start-up procedure to said predetermined control routine with power to said load cut-off and said MV less than said power cut-off point;
   said storing means storing the rate of rise of said MV; and
   said controlling means returning the control of the self-tuning controller to said predetermined routine.

33. The self-tuning controller as set forth in claim 32, further comprising an integral time counter for integrating time with said self-tuning controller in a self-tuning mode subsequent to being in said predetermined control routine;
   said storing means storing the present MV value as $X_m$ with the rate of rise of MV decreasing a predetermined percentage of the MV value initially recorded, and storing the maximimum value $X_{max}$ of MV;
   said calculating means computing the PB, ITC and DTC with MV less than a predetermined amount from $X_{max}$ by computing:
   (1) the rise in MV from $X_r = X_{max} - X_{min}$;
   (2) retreiving the PB value from a stored table in said storing means using $X_r$;
   (3) retrieving the ITC value from said stored table;
   (4) retrieving the DTC value by subtracting a predetermined amount from said ITC table value; and
   said controlling means controlling said self-tuning controller with normal three term control with the ITC value initially set to zero, and controlling said self-tuning controller in an adaptive control mode with said integral counter storing a value a given multiple of the value previously stored therein for automatically self-tuning the controller.

34. The self-tuning controller as set forth in claim 33, wherein said means for controlling returning the self-tuning controller to a predetermined control routine; and re-entering the self-tuning programmed control at least subsequent to any one of the incrementation of said integral counter, storing $X_{min}$, the storing of $X_{max}$, said controlling means controlling said self-tuning controller in a normal three term control mode, and the enablement of said adaptive control mode.

35. The self-tuning controller as set forth in claim 34, wherein said calculating means determines the decrease in the rate of rise of MV to said predetermined percentage, determines a decrease in said MV prior to recording $X_{max}$, determines a drop in MV more than a predetermined amount before calculating the PB, ITC and DTC values and setting said integral counter to zero; and said integral counter incrementing time to cause said controlling means to enable said adaptive control mode.

36. The self-tuning controller as set forth in claim 30, further comprising an integral counter and wherein said calculating means calculates error MV−SP, determines if error MV−SP is greater than a predetermined error criteria and within a predetermined approach control parameter;

said integral counter incrementing time;

said calculating means determining if the count in said integral counter is greater than a predetermined error criteria and within a predetermined approach control parameter;

said integral counter incrementing time;

said calculating means determining if the count in said integral time counter is greater or less than a predetermined multiple of the count previously stored therein;

said self-tuning controller further comprising means for classifying the controller response as being overdamped and with the integral count less than said predetermined multiple, and classifying the controller response as being underdamped with the integral count greater than said predetermined multiple;

said calculating means decreasing PB by a fixed amount with an overdamped response, and increasing PB by a fixed amount with an underdamped response, determining if the count in said integral counter is greater than a second predetermined multiple of the count previously stored therein; and said controlling means causing said self-tuning controller to enter the adaptive mode control with the count in said integral counter greater than said second predetermined multiple.

37. The self-tuning controller as set forth in claim 36, wherein said control means returns said self-tuning controller to a predetermined control routine and causes said self-tuning controller to re-enter the self-tuning control mode at least subsequent to the determination of the error criteria and within a predetermined approach control parameter;

said calculating means decreasing or increasing the PB value by a fixed amount, and determining if the count in said integral counter is greater than a second predetermined multiple; and said control means controlling the self-tuning controller in said adaptive mode control.

38. The self-tuning controller as set forth in claim 37, wherein said calculating means determines if the count in said integral time counter is less than a predetermined percentage of the previously stored value, with error MV−SP being less than "1" and controller response classified as underdamped;

said control means returning the self-tuning controller to a predetermined routine for controlling said at least one load characteristic with error MV−SP greater than "1"; and said classifying means classifying the controller response as being underdamped with the count in said integral counter less than "1".

39. A method of calculating the optimum values of Proportional Band (PB), Integral Time Constant (ITC) and Derivative Time Constant (DTC), and adapted for use with a microprocessor-based Proportional-Integral-Derivative (PID) controller for controlling at least one characteristic of a load, comprising:

establishing a given period of oscillation at a selected point between a setpoint and a reference condition of said at least one load characteristic by reducing power to the load to a predetermined level; monitoring the time for said at least one load characteristic to attain a maximum value thereof to measure the time for said at least one load characteristic to reach said maximum value from the period of oscillation;

calculating PB, ITC and DTC from said maximum value; and controlling said at least said one load characteristic with said controller using the calculated PB, ITC and DTC.

40. The method as set forth in claim 39, further comprising placing the load in ON/OFF control for said given period of oscillation; and calculating the PID values from the amplitude and period of oscillation of said at least one load characteristic.

41. The method as set forth in claim 39, further comprising monitoring the control response to a perturbation; altering the PB setting if said at least one load characteristic does not attain setpoint within a particular time frame with respect to ITC with a given type power applied to the load.

42. The method as set forth in claim 39, further comprising monitoring the control response to a perturbation; altering a power gain setting of the load if said at least one load characteristic does not attain setpoint in a given time frame with respect to ITC with a given type power to the load.

43. The method as set forth in any one of claims 39, 40, 41 or 42, wherein said given period of oscillation is one-quarter cycle, said selected point is substantially one-half way between setpoint and said reference condition, and said predetermined power level is zero power.

44. A method of calculating the optimum values of Proportional Band (PB), Integral Time Constant (ITC) and Derivative Time Constant (DTC), and adapted for use with a microprocessor-based Proportional-Integral-Derivative (PID) temperature controller for controlling the temperature of a load, comprising:

establishing a given period of oscillation at a selected point between setpoint temperature and ambient temperature of a load by reducing power to said load to a predetermined level;

monitoring the maximum temperature attained by said load to measure the time for the load to reach said maximum temperature from the establishment of the power reduction;

calculating PB, ITC and DTC from said measured time; and controlling the temperature of said load using the calculated PB, ITC and DTC.

45. The method as set forth in claim 44, further comprising placing the load in ON/OFF control for said given period of oscillation; and calculating the PID values from the amplitude and period of oscillation of the load temperature.

46. The method as set forth in claim 44, further comprising monitoring the control response to a perturbation; altering the PB setting if the load temperature does not attain setpoint within a particular time frame with respect to ITC with heating power being applied to the load.

47. The method as set forth in claim 44, further comprising monitoring the control response to a perturbation; altering the Relative Cool Gain setting if the load temperature does not attain setpoint within a given time frame with respect to ITC with the temperature controller demanding cooling power at the time of the perturbation.

48. The method as set forth in any one of claims 44, 45, 46 or 47, wherein said period of oscillation is one-quarter cycle, said selected point is substantially one-half way between setpoint, said reference condition is ambient temperature, and said predetermined power level is zero.

* * * * *